United States Patent [19]
Raz et al.

[11] Patent Number: 5,715,633
[45] Date of Patent: Feb. 10, 1998

[54] VERSATILE MODULAR OFFICE PARTITIONS

[75] Inventors: Dan Raz; Anatoly Konik, both of Haifa, Israel

[73] Assignee: Finish Group Ltd., Kiryat Ata, Israel

[21] Appl. No.: 553,912

[22] Filed: Nov. 6, 1995

[51] Int. Cl.[6] .................................................. E04C 2/52
[52] U.S. Cl. .................... 52/220.7; 52/36.1; 52/71; 52/239; 52/243.1; 52/481.2; 52/489.1; 52/656.1; 52/656.9; 52/761
[58] Field of Search .................. 52/36.1, 239, 220.7, 52/71, 126.3, 243.1, 481.2, 489.1, 761, 656.1, 656.9

[56] References Cited

U.S. PATENT DOCUMENTS

| | | |
|---|---|---|
| 3,017,969 | 1/1962 | Nielsen . |
| 3,583,466 | 6/1971 | Dreyer . |
| 3,686,810 | 8/1972 | Allen .................... 52/481.2 X |
| 3,875,711 | 4/1975 | Palmer . |
| 3,998,018 | 12/1976 | Hodges ..................... 52/481.2 |
| 4,085,789 | 4/1978 | Steiner et al. . |
| 4,100,709 | 7/1978 | Good . |
| 4,468,067 | 8/1984 | Jenkins . |
| 4,597,140 | 7/1986 | Girard . |
| 4,597,690 | 7/1986 | Girard . |
| 4,905,428 | 3/1990 | Sykes ........................ 52/126.4 |
| 5,081,808 | 1/1992 | Bastian et al. .............. 52/220.7 |
| 5,207,041 | 5/1993 | Wills ......................... 52/220.7 |
| 5,219,406 | 6/1993 | Raz . |
| 5,408,796 | 4/1995 | Hashimoto et al. ......... 52/481.2 X |

*Primary Examiner*—Christopher Kent
*Attorney, Agent, or Firm*—Mark M. Friedman

[57] ABSTRACT

A space partition having an inner volume for accommodating electrical wires and the like, and providing convenient access thereto. The space partition is generally formed by a framework having a pair of vertical members with a cross member connecting therebetween. The cross member includes a pair of connectors, each engaging one of the vertical members, and a linking element connecting the connectors to each other, the linking element including a pair of parallel rods. Features are provided for facilitating temporary removal of panels and covers of the space partition, thereby enabling easy access to the inner volume of the space partition.

27 Claims, 39 Drawing Sheets

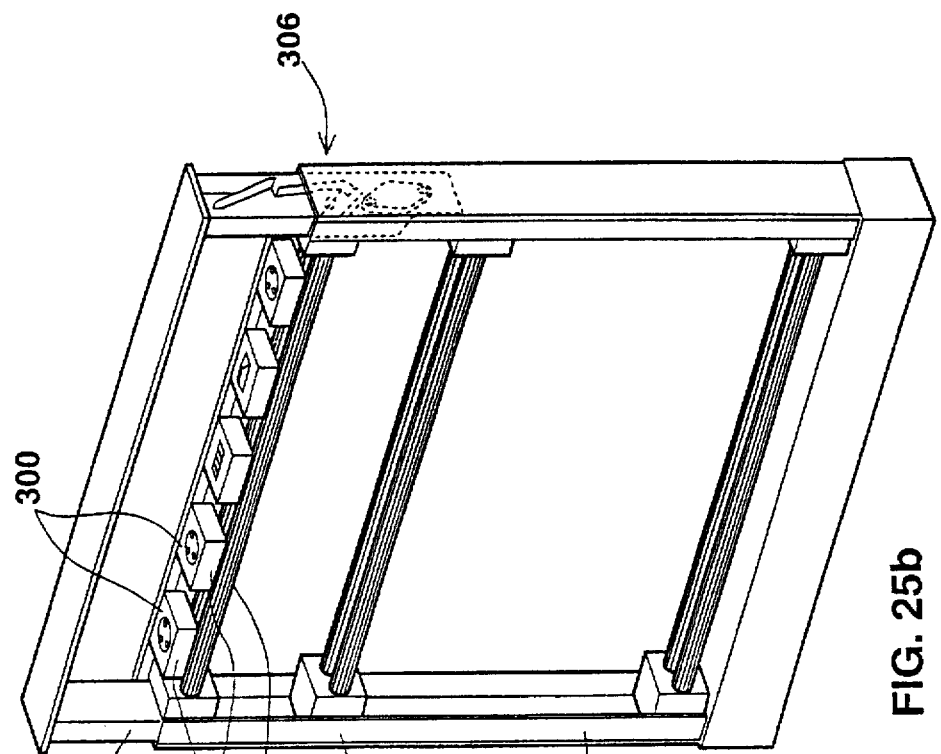
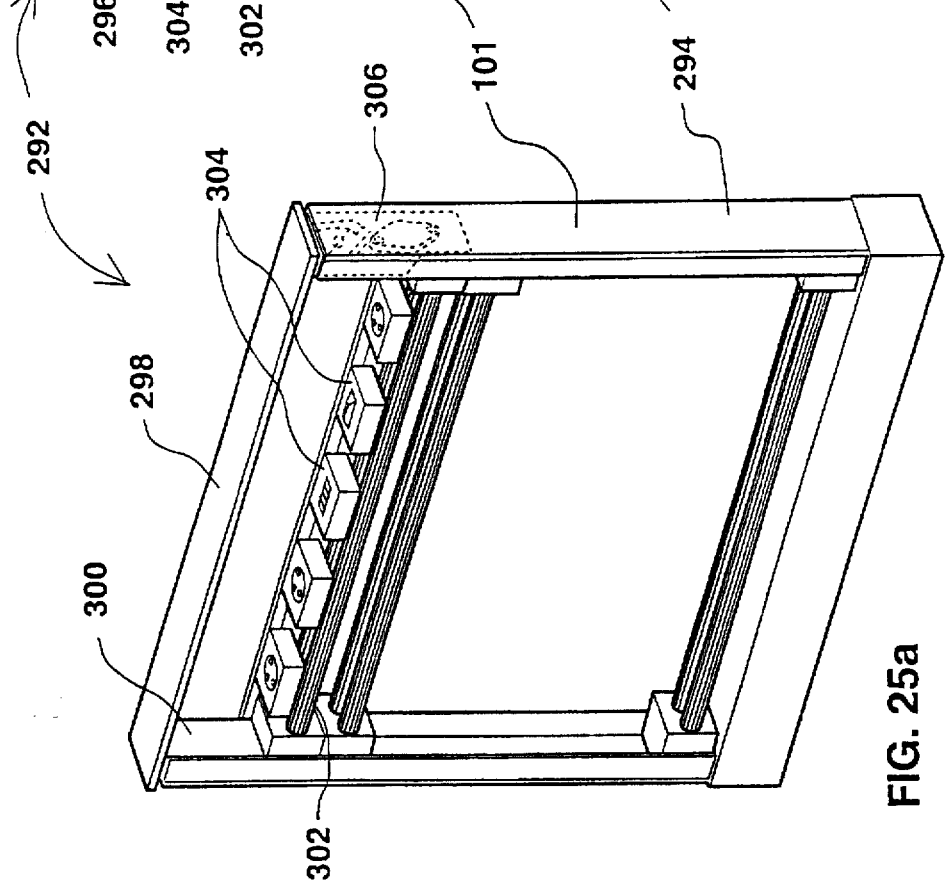
FIG. 25b
FIG. 25a

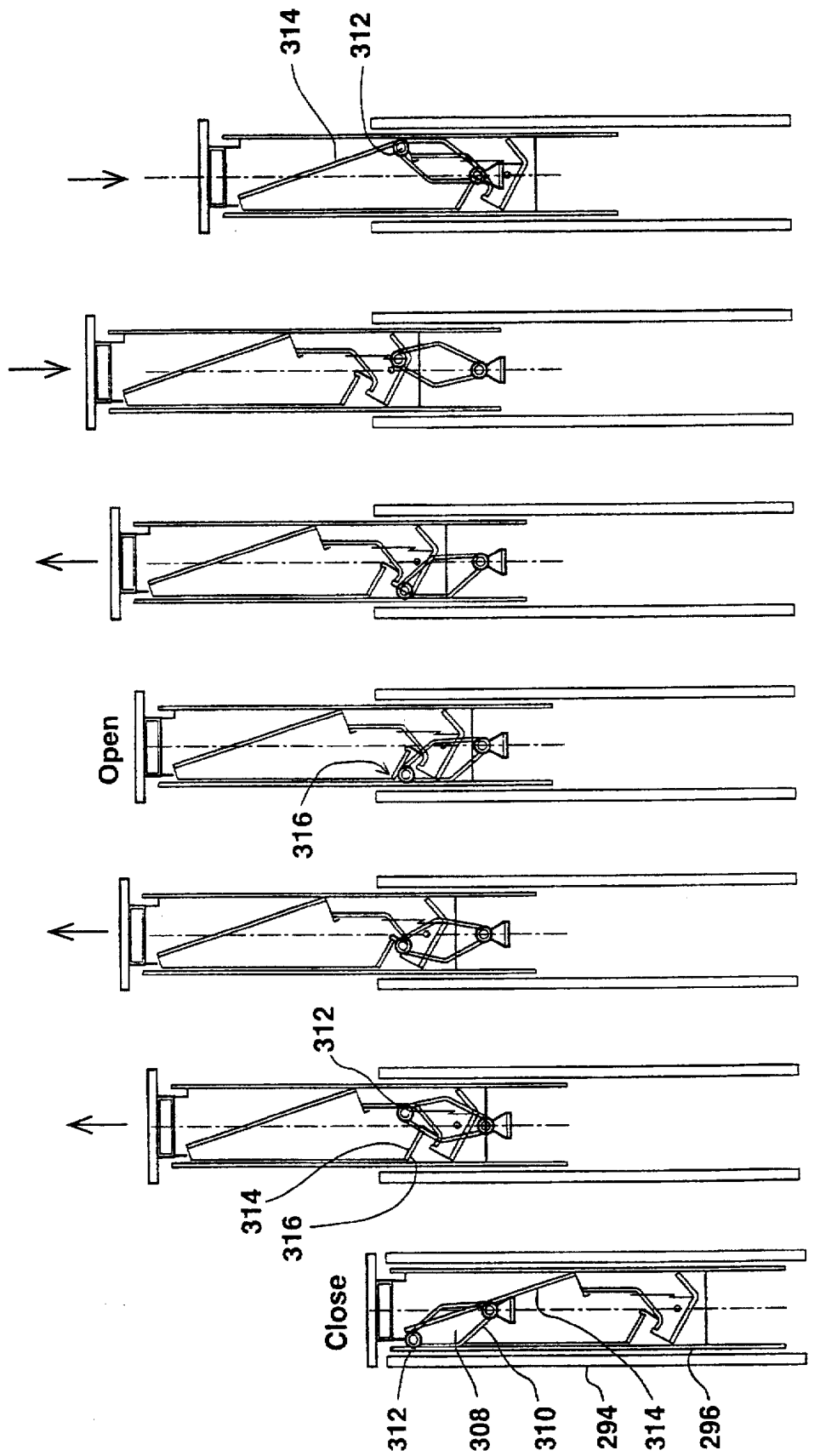

VERSATILE MODULAR OFFICE PARTITIONS

FIELD AND BACKGROUND OF THE INVENTION

The present invention relates to modular open space office partitions of variable adjustable modular dimensions and, more particularly, to a space partition having an inner volume for accommodating electrical wires and the like, and providing convenient access thereto.

Modern office buildings are often built to include large open spaces which are subsequently subdivided into a number of office units of various sizes and shapes to fit the desire of the users. The partitioning of large spaces into individual office units is typically accomplished by the use of space partitions of various types.

Typically these partitions take the form of a series of modular units which can be interconnected with each other to form the desired enclosed spaces. Each partitioning unit is typically made up of a rigid welded metal frame of some standard span and height. The word 'span' is used throughout to unambiguously indicate the distance between the two upright members of each modular unit. The use of the word 'width', which could variously signify either the span, as defined above, or the thickness of the module measured from front to back, is thus avoided.

The frame is typically covered on both sides with decorative panels made, for example, of fabric, wood, glass, etc. and, in some cases, containing acoustic material to create an acoustic barrier to cut down on sound transmission between offices. The space between the front and back decorative panels defines a cavity in which various electrical, telephone, computer, communication and other wires can be located.

The individual modules are made so that they can easily be connected to adjoining modules to form the complete partition. Installation of the system involves connecting the rigid metal frames to each other to form the desired configuration, the passing of the various electrical, phone and computer lines through the metal frames, and the covering of the front and back faces of each metal frame with decorative covering panels.

While the system is, in general, highly convenient to install, it suffers from a major disadvantage, namely, the modules are ordinarily available in only several standard spans and heights. This is because the metal frames forming the backbone of each module are typically constructed by welding four or more pieces of metal together to form a rigid monolithic structure.

To form a framework for supporting a space partition using presently known technology one normally permanently connects, as by welding, two vertical members and two or more horizontal members to form a rectangular structure onto which decorative panels can be installed to form the partition. For practical reasons relating to ease of mass manufacturing and inventory control, only a small number of standard sizes are manufactured by the various space partition manufacturers.

To accommodate non-standard space requirements, special modules must be fabricated at the manufacturing site. Such fabrication requires the welding of the vertical members and cross-members together to form a permanent structure. The various member welded to form a framework, must, of course, be capable of being welded to each other, which tends to greatly reduce the range of materials out of which the members may be made. For example, the use of plastic members, which may be otherwise desirable, may be precluded since they may be incapable of being welded to other materials.

Furthermore, transport of such structures from the manufacturing site to the installation location is costly and problematical, since the structures take up considerable space and since they can be bent or otherwise damaged during transport unless great care is taken.

U.S. Pat. No. 5,219,406 to the inventor of the present invention addresses many of the shortcomings of the conventional configurations by providing a framework for space partitions which can quickly and inexpensively be customized for any desired dimensions and which obviates the need to fabricate permanent and cumbersome rigid welded frames. The framework can be quickly assembled on-site using a small number of components, most of which are standard. The framework module is assembled from a pair of vertical members which may be of any desired height, including standard heights. The distance between adjoining vertical members, or the span of the module, is determined by the length of the cross member made of cylindrical rods or tubes which can be cut on-site, or which can be precut at the manufacturing facility, to any desired length. The rods or tubes are readily fastened at each end to the connector. Each connector is then easily attached to one of the vertical members. Any number of such rod and connectors sets may be used to connect the two vertical members to form a framework of the desired size.

The framework described in U.S. Pat. No. 5,219,406 has an important additional feature of providing an inner volume for accommodating electrical wires and the like. Such an inner volume has great potential utility for accommodating all types of electrical wiring, such as power supplies, computer wires and communications lines, other types of cables or supply lines, for example, for water or gas, as well as providing hidden storage space.

However, U.S. Pat. No. 5,219,406 fails to realize the potential of this inner volume. The framework disclosed is used with panels of a permanent or semi-permanent type, thereby only providing access to the inner volume at the time of installation. In the case that access is needed for rewiring or maintenance, professional services are required for the one-time removal of the panels. At other times, the inner volume of the space partition remains inaccessible, precluding its use for a hidden power sockets and the like, and for hidden storage.

There is thus a widely recognized need for a modular office partition system which can be easily installed in a space of standard or non-standard dimensions, and which will provide an easily accessible inner volume for accommodating all types of electrical wiring, cables or supply lines, and for providing hidden storage space.

SUMMARY OF THE INVENTION

The present invention is of space partitions having an inner volume for accommodating electrical wires and the like, and providing convenient access thereto.

According to the teachings of the present invention there is provided, a space partition having an inner volume for accommodating electrical wires and the like, and providing convenient access thereto, the space partition comprising: (a) a pair of vertical members; (b) a cross member connecting the vertical members, the cross member including: (i) a pair of connectors, each of the connectors capable of engaging one of the vertical members, and (ii) a linking element connecting the connectors to each other, the linking element including a pair of parallel rods; and (c) a swing-out panel assembly including: (i) a bracket attached to the cross member, (ii) an upper lever having a first end and a second end, the first end being pivotally attached to the bracket, (iii) a lower lever having a first end and a second end, the first end being pivotally attached to the bracket, and (iv) a panel pivotally attached to the second ends of the upper lever and the lower lever such that the panel is displaceable between a closed position in which the panel conceals the inner volume and an open position in which the panel allows convenient access to the inner volume.

According to a further feature of the present invention, the space partition has a first face and a second face, the panel forming a part of the first face when in the closed position, the space partition further comprising: (a) an additional upper lever having a first end and a second end, the first end being pivotally attached to the bracket; (b) an additional lower lever having a first end and a second end, the first end being pivotally attached to the bracket; and (c) an additional panel pivotally attached to the second ends of the additional upper lever and the additional lower lever such that the additional panel is displaceable between a closed position in which the additional panel conceals the inner volume, forming part of the second face, and an open position in which the additional panel allows convenient access to the inner volume.

According to a further feature of the present invention, there is also provided a clip-out panel assembly which includes: (a) a panel; and (b) a plurality of clips attached to the panel, each of the clips having a substantially rigid downward facing hook and an upwardly bearing resilient catch.

According to a further feature of the present invention, the cross member provides at least one vertical bore, the space partition further comprising: (a) a vertical pole mountable in the at least one vertical bore; and (b) modular trim assembly attachable to the vertical pole to form a plinth along the space partition, the modular trim assembly including: (i) a trim support having a substantially concave surface of substantially cylindrical form for abutting the vertical pole and a snap-on/snap-off mounting for receiving a piece of trim, (ii) at least one clip for securing the trim support to the vertical pole, and (iii) a piece of trim attachable to the trim support.

According to a further feature of the present invention, there is also provided an electrical socket assembly including: (a) an electrical socket for supplying electrical power; and (b) a bracket attached to the socket, the bracket being shaped such that, when in a first orientation, the bracket is insertable between the pair of parallel rods and, when rotated to a second orientation, the bracket engages the pair of parallel rods so as to maintain the socket in a fixed position.

According to a further feature of the present invention, there is also provided: (a) a secondary framework mounted within, and vertically displaceable relative to, the vertical members; and (b) a cover attached to the secondary framework, wherein the secondary framework assumes a first position in which the cover conceals the inner volume, and a second position in which the cover is raised so as to allow access to the inner volume.

There is also provided, according to the teachings of the present, a space partition having an inner volume for accommodating electrical wires and the like, and providing convenient access thereto, the space partition comprising: (a) a pair of vertical members; (b) an upper cross member connecting the vertical members and a lower cross member connecting the vertical members, each of the upper and lower cross members including: (i) a pair of connectors, each of the connectors capable of engaging one of the vertical members, and (ii) a linking element connecting the connectors to each other, the linking element including a pair of parallel rods; and (c) a clip-out panel assembly including: (i) a panel; and (ii) a plurality of clips attached to the panel, each of the clips having a substantially rigid downward facing hook and an upwardly bearing resilient catch such that at least one of the clips provides a substantially rigid downward facing hook for engaging the lower cross member to support the panel and such that at least one of the clips provides a resilient catch for retaining the panel against the upper cross member.

According to a further feature of the present invention, the hook has a depth and the resilient catch has a range of flexibility, the range of flexibility being at least as large as the depth.

According to a further feature of the present invention, the panel has a rear surface, the rear surface being provided with a plurality of slots for attachment of the clips, the slots being positioned such that the clips may be attached to the panel at any of at least three vertical positions.

According to a further feature of the present invention, there is also provided a swing-out panel assembly including: (a) a bracket attached to one of the upper and lower cross members; (b) an upper lever having a first end and a second end, the first end being pivotally attached to the bracket; (c) a lower lever having a first end and a second end, the first end being pivotally attached to the bracket; and (d) a panel pivotally attached to the second ends of the upper lever and the lower lever such that the panel is displaceable between a closed position in which the panel conceals the inner volume and an open position in which the panel allows convenient access to the inner volume.

There is also provided, according to the teachings of the present invention, a space partition having an inner volume for accommodating electrical wires and the like, and providing convenient access thereto, the space partition comprising: (a) a pair of vertical members; (b) an upper cross member connecting the vertical members and a lower cross member connecting the vertical members, each of the upper and lower cross members including: (i) a pair of connectors, each of the connectors capable of engaging one of the vertical members, and (ii) a linking element connecting the connectors to each other, each of the upper and lower cross members providing at least one vertical bore; (c) a vertical pole mounted in the vertical bore of the lower cross member; and (d) a modular trim assembly attachable alternately to the vertical pole to form a plinth of the space partition, and to the vertical bore of the upper cross member to form a top to the space partition, the modular trim assembly including: (i) a trim support having a substantially concave surface of substantially cylindrical form for abutting the vertical pole, a substantially cylindrical projection for engaging the vertical bore of the upper cross member, and a snap-on/snap-off mounting for receiving a piece of trim, (ii) at least one clip for securing the trim support alternately to the vertical pole and to the vertical bore of the upper cross member, and (iii) a piece of trim attachable to the trim support.

According to a further feature of the present invention, the trim support provides two substantially concave surfaces of substantially cylindrical form for abutting two vertical poles, and two substantially cylindrical projections for engaging two vertical bores.

According to a further feature of the present invention, there is also provided a swing-out panel assembly including: (a) a bracket attached to one of the upper and lower cross members; (b) an upper lever having a first end and a second end, the first end being pivotally attached to the bracket; (c) a lower lever having a first end and a second end, the first end being pivotally attached to the bracket; and (d) a panel pivotally attached to the second ends of the upper lever and the lower lever such that the panel is displaceable between a closed position in which the panel conceals the inner volume and an open position in which the panel allows convenient access to the inner volume.

There is also provided, according to the teachings of the present invention, a space partition providing a hidden electrical power supply, the space partition comprising: (a) a pair of vertical members; (b) a cross member connecting the vertical members, the cross member including: (i) a pair of connectors, each of the connectors capable of engaging one of the vertical members, and (ii) a linking element connecting the connectors to each other, the linking element including a pair of parallel rods sufficiently separated so as to accommodate the presence of electrical wires; and (c) an electrical socket assembly including: (i) an electrical socket for supplying electrical power, and (ii) a bracket attached to the socket, the bracket being shaped such that, when in a first orientation, the bracket is insertable between the pair of parallel rods and, when rotated to a second orientation, the bracket engages the pair of parallel rods so as to maintain the socket in a fixed position.

According to a further feature of the present invention, there is also provided a swing-out panel assembly including: (a) a bracket attached to the cross member; (b) an upper lever having a first end and a second end, the first end being pivotally attached to the bracket; (c) a lower lever having a first end and a second end, the first end being pivotally attached to the bracket; and (d) a panel pivotally attached to the second ends of the upper lever and the lower lever such that the panel is displaceable between a closed position in which the panel conceals the inner volume and an open position in which the panel allows convenient access to the inner volume.

According to a further feature of the present invention, there is also provided a clip-out panel assembly which includes: (a) a panel; and (b) a plurality of clips attached to the panel, each of the clips having a substantially rigid downward facing hook and an upwardly bearing resilient catch.

According to a further feature of the present invention, there is also provided: (a) a secondary framework mounted within, and vertically displaceable relative to, the vertical members; and (b) a cover attached to the secondary framework, wherein the secondary framework assumes a first position in which the cover conceals the inner volume, and a second position in which the cover is raised so as to allow access to the inner volume.

There is also provided, according to the teachings of the present invention, a space partition having an inner volume with concealed access thereto, the space partition comprising: (a) a primary framework; (b) a secondary framework mounted within, and vertically displaceable relative to, the primary framework; and (c) a cover attached to the secondary framework, wherein the secondary framework assumes a first position in which the cover abuts the primary framework so as to conceal the inner volume, and a second position in which the cover is lifted away from the primary framework thereby allowing access to the inner volume.

According to a further feature of the present invention, there is also provided a substantially horizontal work-top associated with the primary framework such that, when the secondary framework assumes the first position, the cover forms a substantially continuous surface with the work-top.

According to a further feature of the present invention, there is also provided a latch mechanism for temporarily retaining the secondary framework in the second position.

According to a further feature of the present invention, the secondary framework additionally supports at least one electrical connector.

According to a further feature of the present invention, the secondary framework additionally supports a shelf for hidden storage.

According to a further feature of the present invention, the primary framework includes: (a) a pair of vertical members; (b) a cross member connecting the vertical members, the cross member including: (i) a pair of connectors, each of the connectors capable of engaging one of the vertical members, and (ii) a linking element connecting the connectors to each other, the linking element including a pair of parallel rods sufficiently separated so as to accommodate the presence of electrical wires.

There is also provided, according to the teachings of the present invention, a space partition, the space partition comprising: (a) two spans, each span including: (i) a pair of vertical members, each vertical member having a plurality of slits, (ii) a cross member connecting the vertical members, the cross member including: (A) a pair of connectors, each of the connectors capable of engaging one of the vertical members, and (B) a linking element connecting the connectors to each other, the linking element including a pair of parallel rods; and (b) an alignment insert for engaging the plurality of slits in one of the vertical members of each of the two spans, thereby maintaining the two spans in vertical alignment.

There is also provided, according to the teachings of the present invention, a wire clip for clipping wires passing between two parallel rods, the wire clip comprising: (a) a first jaw having: (i) a clamping strip, the clamping strip having a first end and a second end, (ii) a first side integrally formed with the first end, and (iii) a second side integrally formed with the second end, the first and second sides being formed as hooks such that, when the first jaw is in a first angular position, the first and second sides may be hooked over a first one of the parallel rods, and when the first jaw is rotated to a second angular position with the clamping strip adjacent to the wires, the first and second sides become trapped between the parallel rods; (b) a second jaw having: (i) a clamping strip, the clamping strip having a first end and a second end, (ii) a first side integrally formed with the first end, and (iii) a second side integrally formed with the second end, the first and second sides being formed as hooks such that, when the second jaw is in a first angular position, the first and second sides may be hooked over a second one of the parallel rods, and when the second jaw is rotated to a second angular position with the clamping strip adjacent to the wires, the first and second sides become trapped between the parallel rods; and (c) a tightening element for tightening the clamping strip of the first jaw to the clamping strip of the second jaw so as to clip the wires therebetween.

There is also provided, according to the teachings of the present invention, a space partition comprising: (a) a pair of vertical members; (b) a cross member connecting the vertical members, the cross member including: (i) a pair of connectors, each of the connectors capable of engaging one of the vertical members, and (ii) a linking element connecting the connectors to each other, the linking element including a pair of parallel rods, wherein each of the connectors includes a locating element for engaging one of the vertical members and able to receive the linking element at a first vertical position, and a removable insert for inserting between the locating element and the linking element such that the linking element assumes a second vertical position.

According to a further feature of the present invention, the removable insert includes at least one channel for receiving at least one electrical wire, further comprising a clamping block attachable to the removable insert so as to clamp the at least one electrical wire within the at least one channel.

There is also provided, according to the teachings of the present invention, a space partition framework comprising: (a) a pair of vertical members; (b) a cross member connecting the vertical members, the cross member including: (i) a pair of connectors, each of the connectors capable of engaging one of the vertical members, and (ii) a linking element connecting the connectors to each other, the linking element including a pair of parallel rods; and (c) at least one additional connector attached at an intermediate position along the linking element, the additional connector providing a substantially cylindrical vertical opening.

BRIEF DESCRIPTION OF THE DRAWINGS

The invention is herein described, by way of example only, with reference to the accompanying drawings, wherein:

FIG. 25A is a schematic cut-away perspective view of a fourth embodiment of a space partition, constructed and operative according to the teachings of the present invention, showing a pop-up cover assembly in a lowered position;

FIG. 25B is a schematic cut-away perspective view of the space partition of FIG. 25A, showing a pop-up cover assembly in a raised position;

FIG. 26A is a cross-sectional side view of the space partition of FIG. 25A, showing the state of a latch mechanism while the pop-up cover assembly is in its lowered position;

FIG. 26B is a view similar to FIG. 26A showing the state of the latch mechanism while the pop-up cover assembly is in a first intermediate position;

FIG. 26C is a view similar to FIG. 26A showing the state of the latch mechanism while the pop-up cover assembly is in a second intermediate position;

FIG. 26D is a view similar to FIG. 26A showing the state of the latch mechanism while the pop-up cover assembly is in its raised position;

FIG. 26E is a view similar to FIG. 26A showing the state of the latch mechanism while the pop-up cover assembly is in a third intermediate position;

FIG. 26F is a view similar to FIG. 26A showing the state of the latch mechanism while the pop-up cover assembly is in a fourth intermediate position;

FIG. 26G is a view similar to FIG. 26A showing the state of the latch mechanism while the pop-up cover assembly is in a fifth intermediate position;

DESCRIPTION OF THE PREFERRED EMBODIMENTS

The present invention is of modular space partitions which can be readily made to be of any desired size so as to accommodate standard and non-standard space requirements, and which provide easy access to an inner volume for accommodating electrical wires and the like.

The operation and principles of space partitions according to the present invention can be better understood with reference to the drawings, which are illustrative only, and which demonstrate examples of various aspects of embodiments of space partitions according to the present invention.

The present invention will now be described with reference to four specific embodiments. Each of these embodiments is based primarily, although not exclusively, on a framework having certain elements similar to the framework disclosed in the aforementioned U.S. Pat. No. 5,219,406 (which is hereby incorporated in its entirety by reference). In order to facilitate a clear understanding of the various embodiments of the present invention, a framework usable with each of the four embodiments will first be described in detail with reference to FIGS. 1 to 8. The first embodiment will then be described with reference to FIGS. 9 to 12. Then, with reference to FIGS. 13 to 15, the second embodiment will be described. The third embodiment will then be described with reference to FIGS. 16 to 24. Then, with reference to FIGS. 25 to 27, the fourth embodiment will be described. Finally, with reference to FIGS. 28–38, a number of important accessories for use with the space partitions of the present invention will be described.

Figure 1:
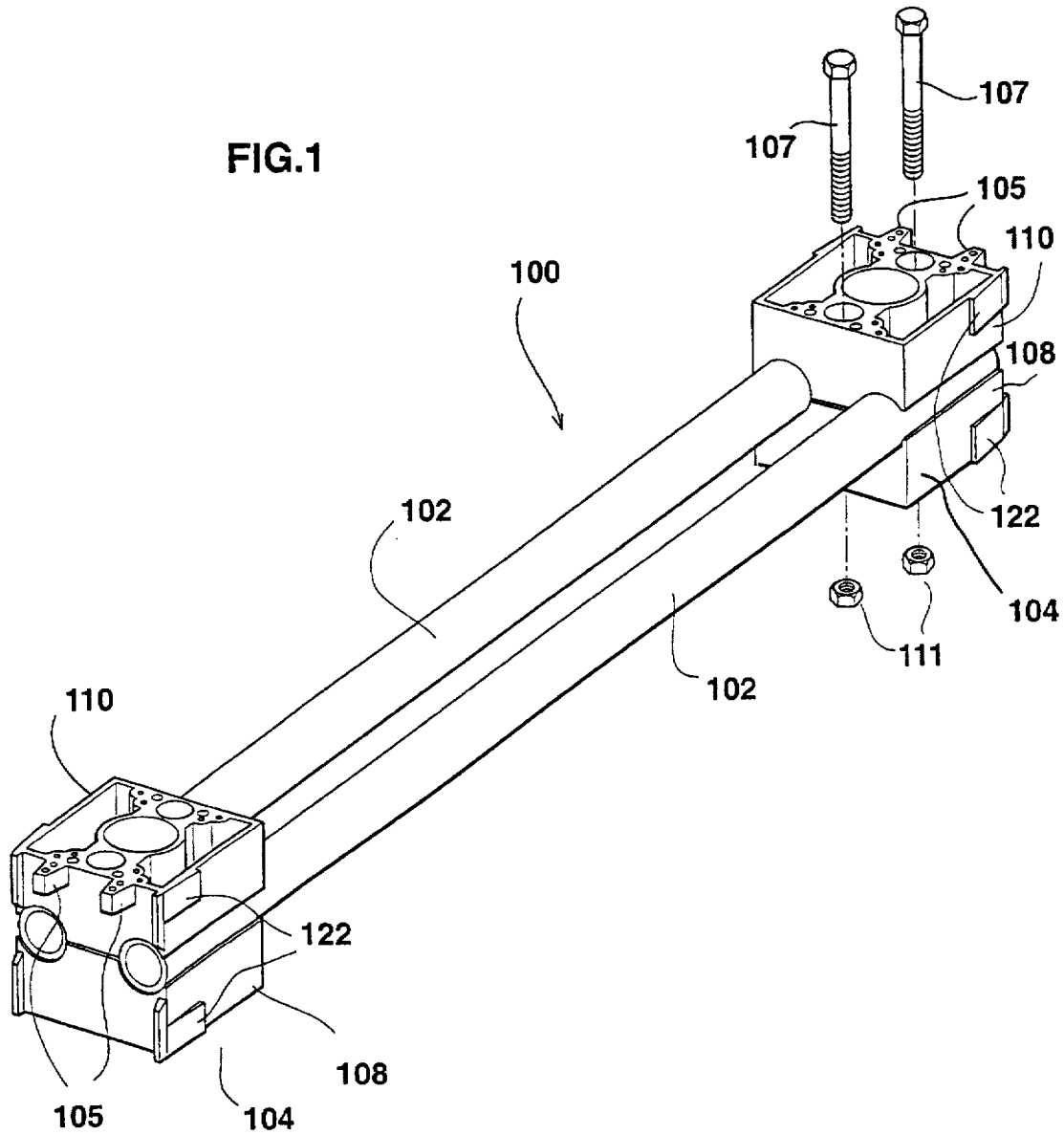
FIG. 1 is a perspective view of a cross member for use in forming a space partition according to the present invention.
Figure 2:
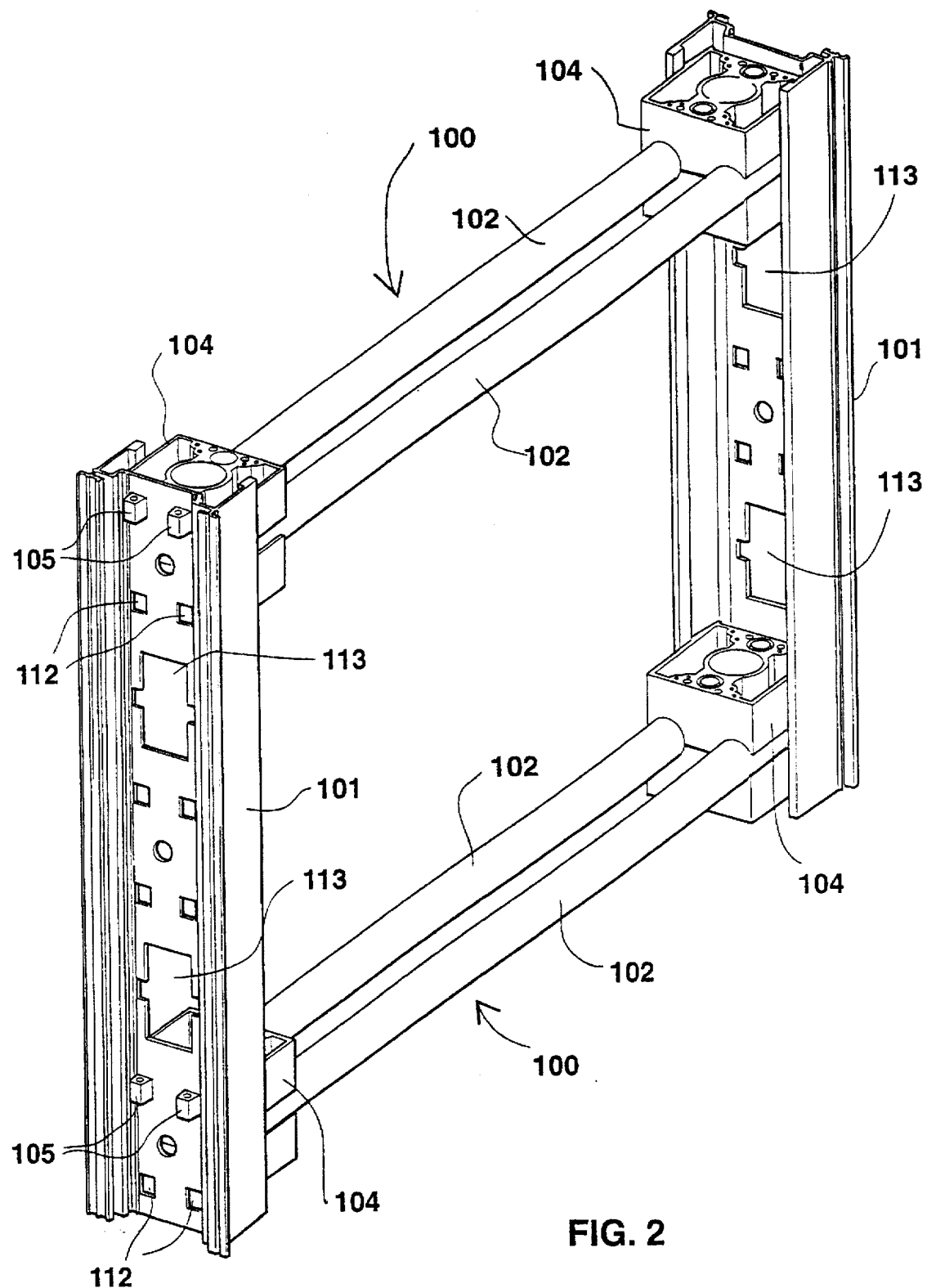
FIG. 2 is a perspective view of a framework for use in a space partition according to the present invention.

Referring now to the drawings, FIG. 1 illustrates a cross member, designated generally as 100. As can be seen in FIG. 2, cross member 100 is used to connect a pair of vertical members 101. Cross member 100 may be constructed in a variety of forms and shapes, but typically includes at least one linking element, such as a bar or cylindrical tube or rod 102 (hereinafter referred to generally as rod), and connectors 104 at each end of rod 102.

Figure 3:
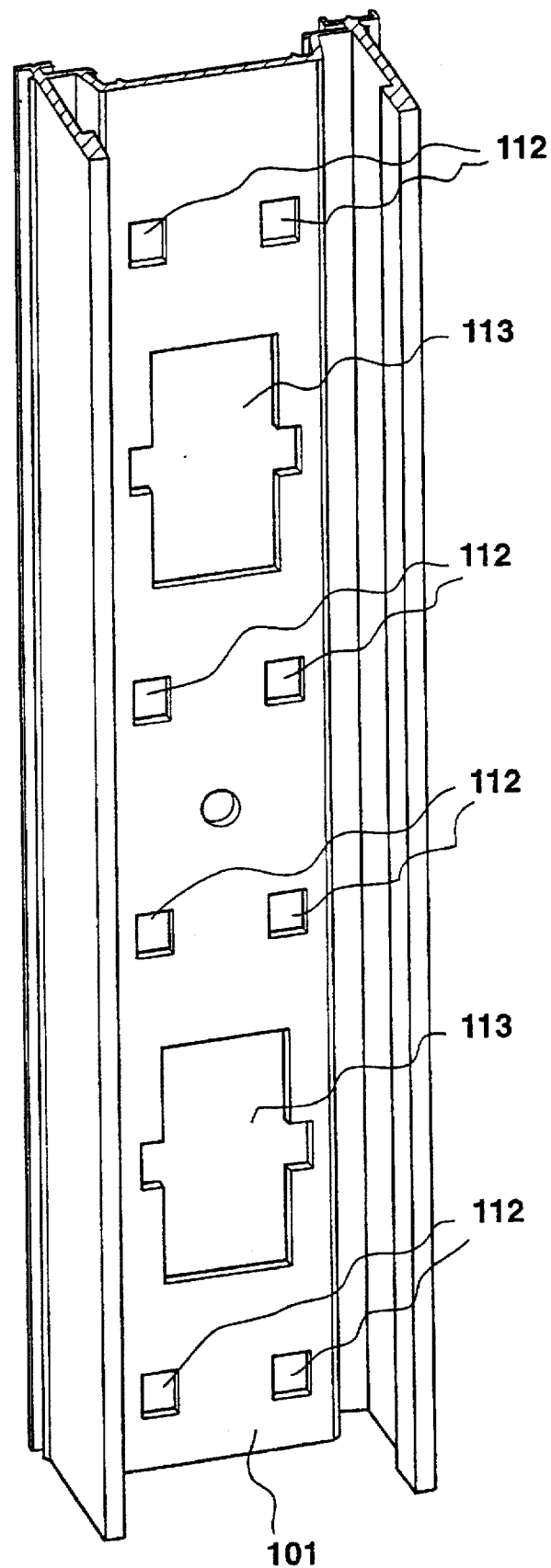
FIG. 3 is a perspective view of a vertical member from the framework of FIG. 2.

Connector 104 is adapted to accept and hold rod 102 and to securely engage one of vertical members 101, preferably with the aid of one or more prongs 105. FIG. 3 shows vertical member 101 to feature a series of slits 112 running along the length of vertical member 101 and capable of accepting prongs 105.

Vertical member 101 also features one or more wire holes 113 for accommodating the various electrical, telephone, computer, communication and other wires and various associated plugs and sockets which are normally included within or must be passed through a space partition.

Rod 102 is cut prior to its insertion into connectors 104 to a length which, when cross member 100 is fully installed, will form a framework of precisely the desired span.

To ensure that the precise span desired is obtained, rod 102 preferably features a pair of holes (not shown) near each of its ends into which one or more projections 116 of connector 104 can fit so as to precisely fix the location of rod 102.

Preferably a pair of parallel rods 102 is used as the linking element. The two rods 102 are preferably separated by a sufficient distance to allow various electrical, phone and computer wires, including their various associated plugs and sockets, to pass easily between rods 102.

Connector 104 is preferably made up of two opposing pieces which, for convenience will be termed a lower connector 108 and an upper connector 110, although upon installation, upper connector 110 may, if desired, be installed below lower connector 108. Lower connector 108 and upper connector 110 may be connected to each other by any convenient means, such as by means of one or more bolts 107 and nuts 111 or by similar fasteners. Preferably the connection between lower connector 108 and upper connector 110 is detachable, as is the connection with rods 102. Lower connector 108 and upper connector 110 are configured so that when they are connected to each other they also firmly hold and retain rods 102.

Figure 4:
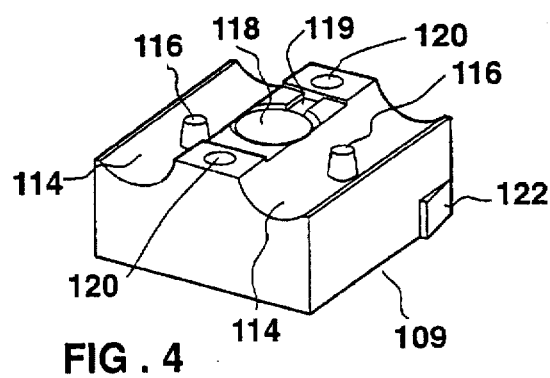
FIG. 4 is a perspective view of the inner portion of a connector piece from the framework of FIG. 2.
Figure 5:
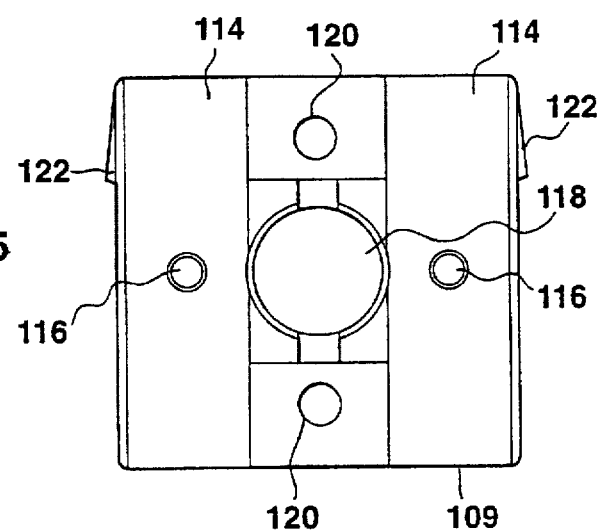
FIG. 5 is a plan view of the inner portion of a connector piece from the framework of FIG. 2.
Figure 6:
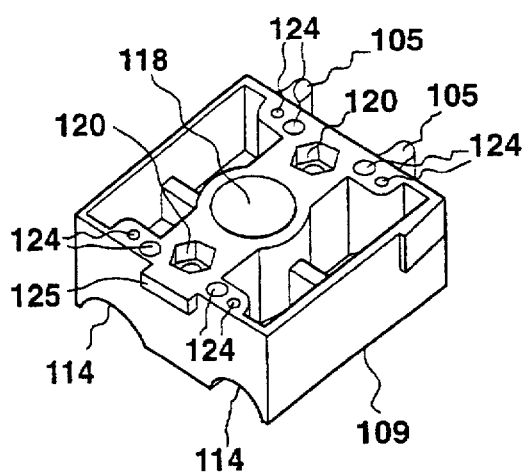
FIG. 6 is a perspective view of the outer portion of a connector piece from the framework of FIG. 2.
Figure 7:
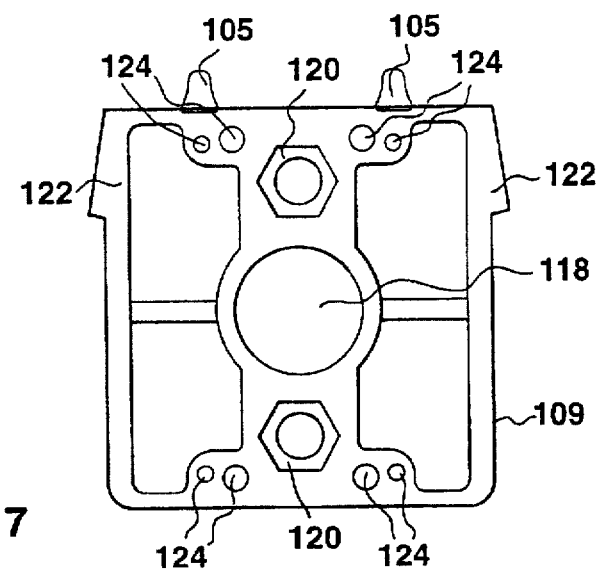
FIG. 7 is a plan view of the outer portion of a connector piece from the framework of FIG. 2.

Connector 104 may be constructed in a wide variety of configurations. Preferably, connector 104 is made up of two opposing pieces (lower connector 108 and upper connector 110) which are identical or nearly identical to each other. The generic connector piece will, for convenience, be generally designated 109. One configuration of connector piece 109 is shown in more detail in FIGS. 4–7. FIG. 4 is a perspective view, and FIG. 5 is a plan view showing some of the details of the inner surface of the connector piece, i.e., the side of connector piece 109 facing the complementary connector piece, while FIGS. 6 and 7 are the corresponding figures showing the outer surface of connector piece 109, i.e., the side facing away from the complementary connector piece.

Rods 102 (not shown in FIGS. 4–7) fit into contoured guides 114. To help secure rods 102 in place and in order to have full control of the precise span of the framework, it is preferable to include protruding members 116 sized and shaped so as to fit into holes (not shown) in rods 102 and thus fix rods 102 at a precise location.

Connector piece 109 also features an opening 118 near its central portion, through which one can insert a pole, rod or tube (not shown) to help support the structure and/or to serve as a supporting leg for the space partition. The pole rod or tube may feature a cushion (not shown) on its lowest extremity to effect a soft non-slip contact with the ground. A slot 119 is provided in connector piece 109 adjacent to opening 118. Slot 119 can receive a rigid tongue (not shown), typically of metal, for securing the pole, rod or tube against slipping through opening 18.

In an alternative embodiment, it may be desirable to include two sets, rather than a single set, of protruding members 116 so that rods 102 coming from both directions can be accommodated by a single connector 104. This feature is attractive wherever it is desired to span a large span between adjoining vertical members 101 and there is concern that long rods 102 may offer inadequate support. In such a case it may be desirable to use two or more shorter rods 102 and connect adjoining rods through a connector 104, having two sets of protruding members 116, which is not in contact with either of vertical members 101. It may further be desirable to insert a pole or tube (not shown) through opening 118 and extend the pole or tube to the floor so that it serves to help anchor and support the structure.

Connector piece 109 also feature means for attaching two connector pieces 109 together. Any suitable means for attachment may be used. Fastener holes 120 of the type which may accommodate a nut and bolt, screw, or similar fastener, are shown in FIGS. 4–7.

Connector piece 109 also preferably features a pair of projections 122 which serve to ensure that connector 104 will not spontaneously disconnect from vertical member 101, as is explained below.

In addition, one or both of connector pieces 109 which form connector 104 may feature prongs 105 which are spaced and shaped so as to engage slits 112 in vertical members 101 and thereby determine the vertical position of the cross member.

Connector piece 109 also features screw holes 124 which can accommodate fasteners for use, for example, in connecting vertical member 101 to a horizontal member which covers the top of the framework. A tab 125 projecting from connector piece 109 is also important in the attachment of a cover for the top of the framework, as will be described below.

Figure 8:
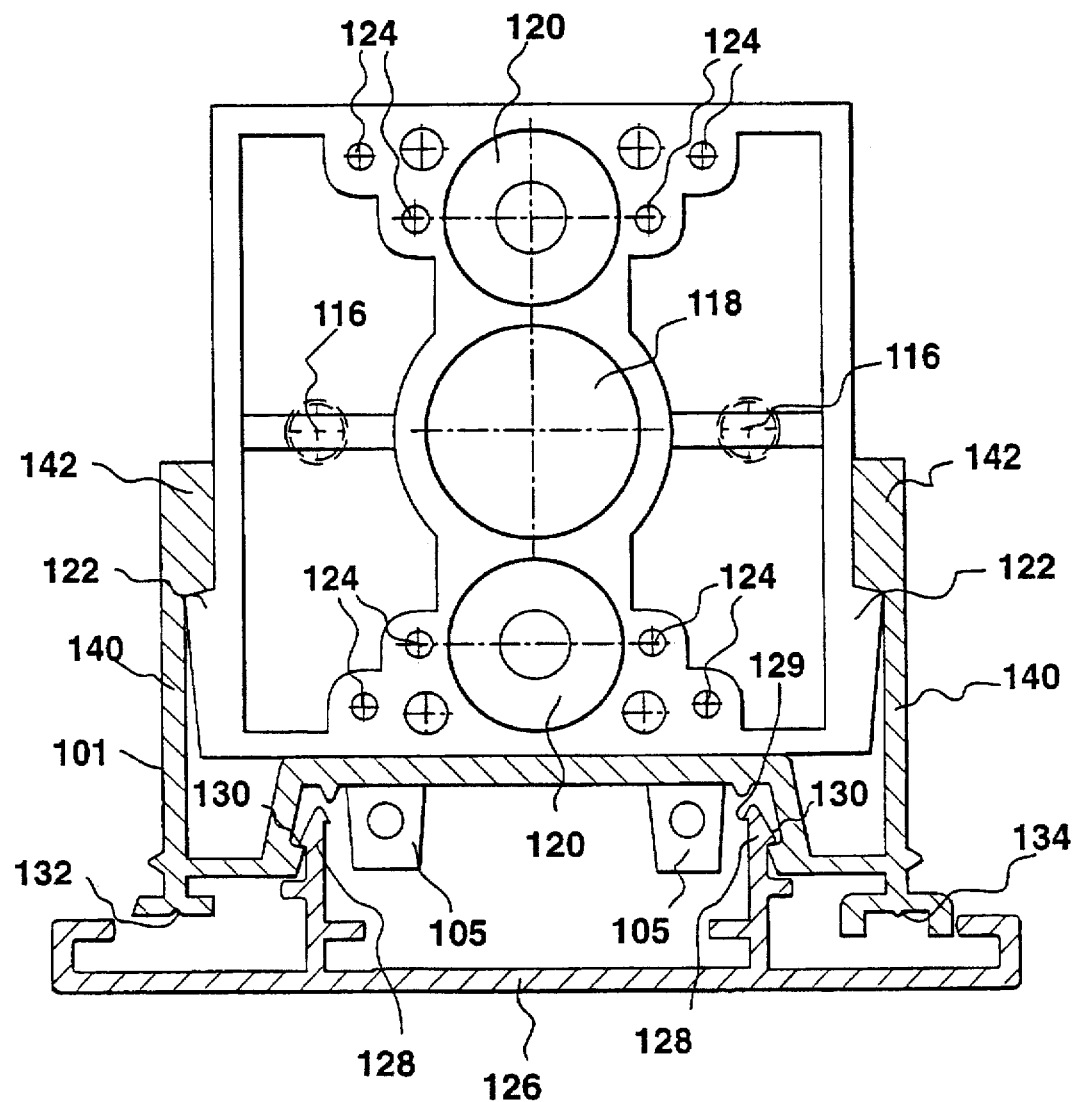
FIG. 8 is a cross sectional view of a vertical member from the framework of FIG. 2, together with a covering plate and a connector.

The connection of connector 104 and vertical member 101 and details of a possible configuration of vertical member 101 can be seen in cross sectional view in FIG. 8. Vertical member 101 features a track running substantially along the entire length of vertical member 101. The track is formed by a pair of parallel arms 140. Each arm 140 includes an inwardly directed catch 142 which is capable of engaging projections 122 of connector 104, preventing the spontaneous release of connector 104.

Vertical member 101 is punched so as to accommodate prongs 105. A cover piece 126 may be snap fitted to the outside of vertical member 101 in order to hide prongs 105 and slits 112 from view and create an aesthetically pleasing cover or jacked. Cover piece 126 is made to snap into place by virtue of its somewhat flexible catches 128 which engage notches 130 on the outside surface of vertical member 101. Vertical member 101 also includes a male attachment 132 and a female attachment 134 for direct or indirect attachment to adjoining members.

As mentioned earlier, it is a major feature of most embodiments of the present invention that they provide convenient access to the inner volume of a space partition. This feature enables full use of the inner volume of space partitions according to the present invention for an extensive range of applications. Examples include all types of electrical wiring, such as power supplies, computer wires and communications lines, other types of cables or supply lines, for example, for water or gas, as well as for providing hidden storage space. The present invention will now be illustrated with reference to four particular embodiments.

Figure 9:
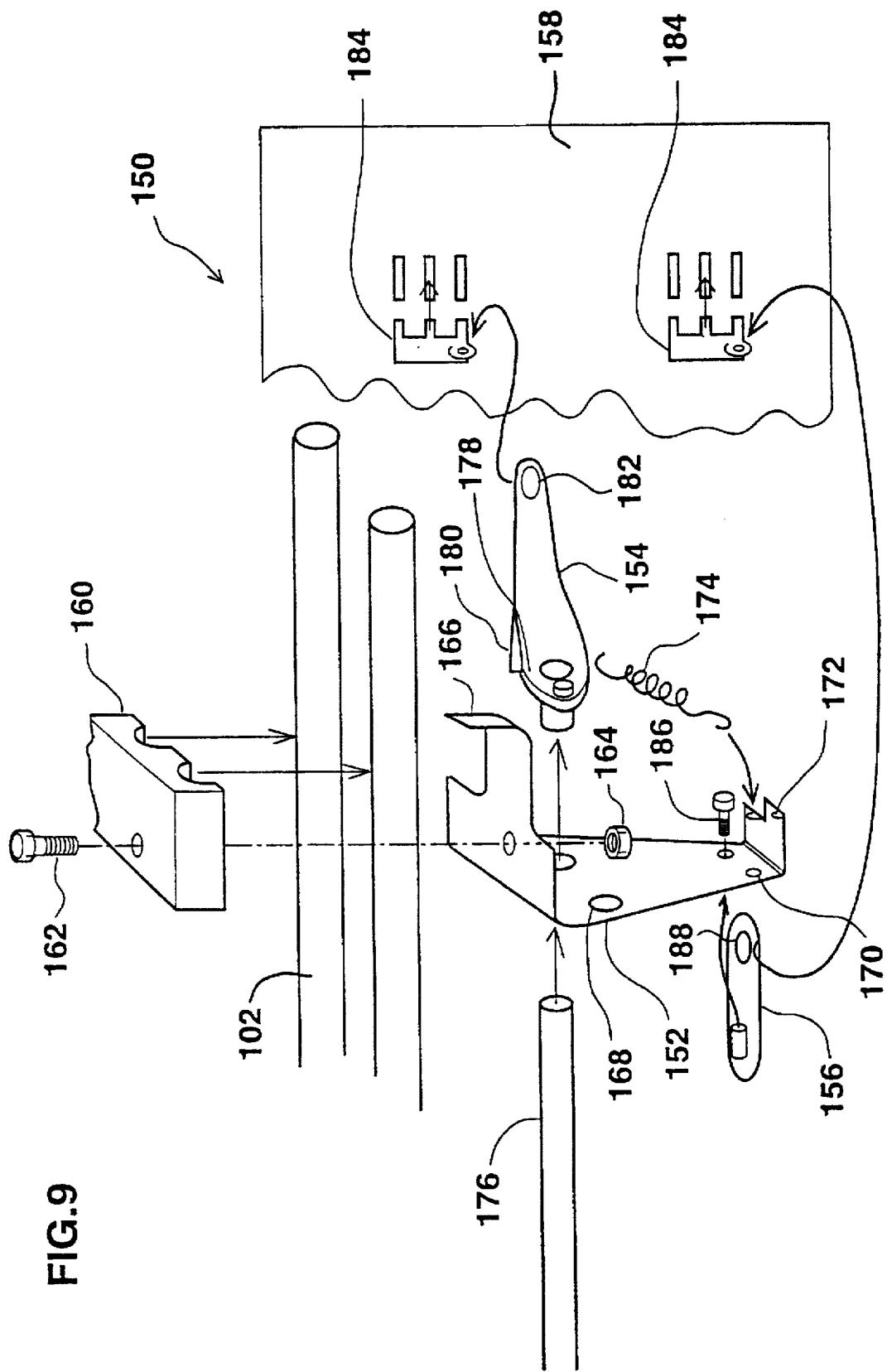
FIG. 9 is an exploded perspective view of a first embodiment of a space partition, constructed and operative according to the teachings of the present invention, the space partition having a swing-up panel assembly for providing easy access to an inner volume.

Turning now to the first embodiment of a space partition according to the present invention, this will be described with reference to FIGS. 9 to 12. FIG. 9 shows the components of a swing-out panel assembly, generally designated 150, for attachment to a pair of rods 102. Generally speaking, swing-out panel assembly 150 includes a bracket 152 for attaching to rods 102, an upper lever 154, a lower lever 156 and a panel 158. Both upper lever 154 and lower lever 156 are pivotally attached at a first end to bracket 152 and at a second end to panel 158 such that panel 158 is displaceable between a closed position in which it conceals the inner volume of the space partition, and an open position in which it allows convenient access to the inner volume of the space partition. Preferably, this entire mechanism is doubled so that panel 158 is supported in two places, typically near opposite ends of panel 158.

Turning now to the features of swing-out panel assembly 150 in more detail, bracket 152 is attached to rods 102 by use of a clamp piece 160 together with a bolt 162 and nut 164. Clamp piece 160 is effectively a half-length variation of connector piece 109 described above. Alternatively, other forms of clamp piece shaped to abut rods 102 may be used. Bracket 152 preferably has an upwardly-turned end 166 for maintaining the alignment of swing-out panel assembly 150 relative to rods 102.

Bracket 152 itself is substantially symmetrical, thereby enabling a swing-out panel assembly 150 to be installed on both sides of the space partition. Thus, bracket 152 has two upper openings 168 for receiving upper levers 154 and two lower openings 170 for receiving lower levers 156. Two further holes 172 are provided for receiving springs 174 for biasing the movement of swing-out panel assembly 150. To prevent catching of springs 174 when swing-out panel assemblies 150 are installed on both sides of the space partition, holes 172 are slightly staggered, as shown.

A first end of upper lever 154 is pivotally attached to upper opening 168. Preferably, in the case that panel 158 is supported in two places by two swing-out panel assembly 150, upper lever 154 is attached to one end of a pole 176 which extends through upper opening 168. The other end of pole 176 extends to the second swing-out panel assembly 150, which is arranged as a mirror image of the first, and insures synchronism between their positions.

Upper lever 154 also features an attachment point 178 for attaching spring 174, an abuttal surface 180 to provide a stop at one end of its movement by abutting one of rods 102.

The second end of upper lever 154 has a pivot 182 for engaging a clip-on hinge piece 184 which is attachable to panel 158.

A first end of lower lever 156 is pivotally attached to lower opening 170, typically by means of a bolt 186. Lower lever 156 is preferably mounted on the opposing side of bracket 152 from upper lever 154, thereby avoiding obstruction of spring 174. The second end of lower lever 156 also features a pivot 188 for engaging a clip-on hinge piece 184 which is attachable to panel 158.

Figure 10A:
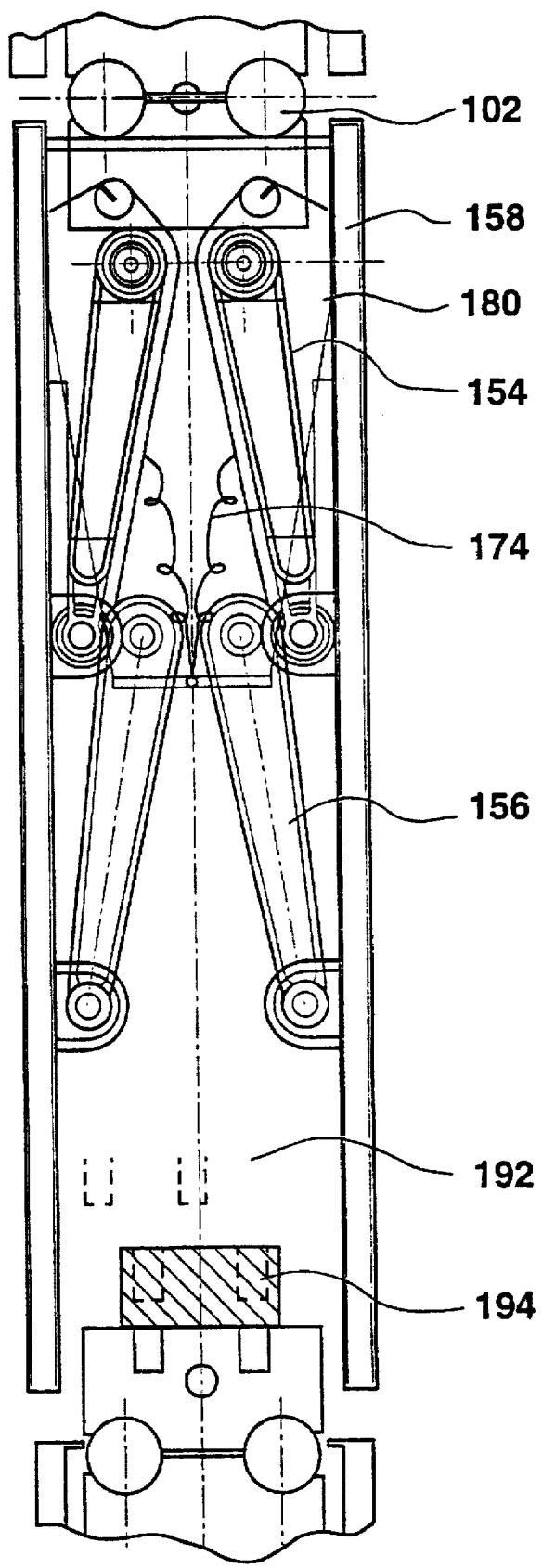
FIG. 10A is a cross-sectional side view of the space partition of FIG. 9, showing two swing-up panel assemblies in their closed positions.

The use of swing-out panel assembly 150 will now be explained with reference to FIGS. 10A and 10B. FIG. 10A shows a space partition, generally designated 190, having an inner volume 192 containing a concealed electrical power supply 194. Space partition 190 features swing-out panel assembly 150 with two sets of levers 154, 156 and panels 158, shown here in their closed position. In this position, panels 158 lie flat, flush with the surrounding panels, such that inner volume 192 is completely concealed.

When access to inner volume 192 is required, panels 158 are drawn gently outwards by grasping their edges manually. Alternatively, a small knob, handle or ribbon may be provided for this purpose. Panels 158 then swing out under the biasing of springs 174 until they reach the position shown in FIG. 10B with abuttal surface 180 in contact with rod 102.

Figure 10B:
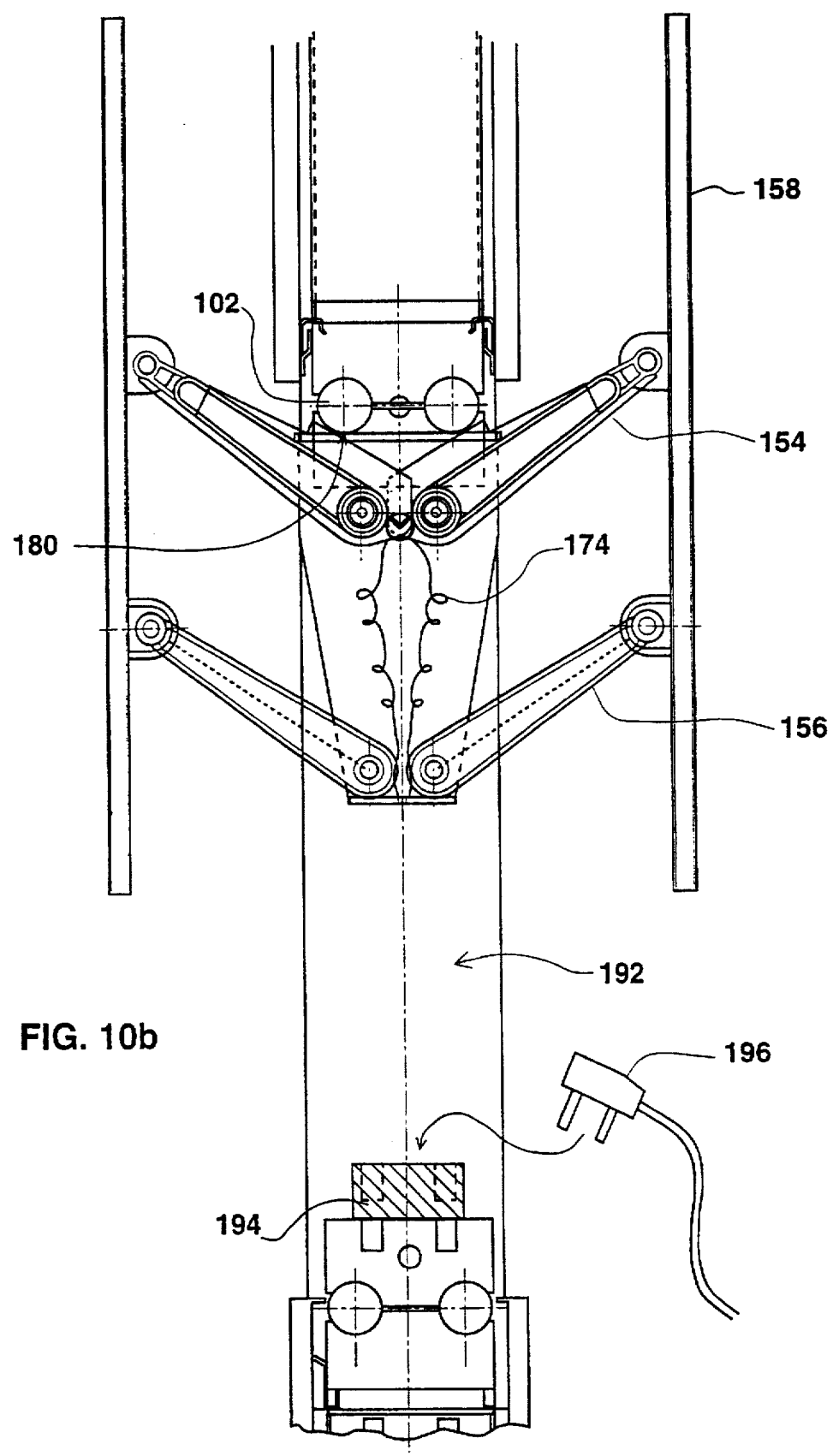
FIG. 10B is a cross-sectional side view of the space partition of FIG. 9, showing two swing-up panel assemblies in their open positions.

FIG. 10B shows space partition 190 with swing-out panel assembly 150 in its open position on both sides. In this position, panels 158 are displaced outwards and upwards, thereby allowing convenient access to inner volume 192, for example, for the attachment of an electrical plug 196 to electrical power supply 194.

When access to inner volume 192 is no longer required, swing-out panel assembly 150 is returned to the closed position of FIG. 10A by gentle downward pressure exerted manually on panels 158.

Turning now to FIGS. 11 and 12, an electrical socket assembly will be described. This electrical socket assembly may be used with any embodiment of the present invention to provide a convenient manner of mounting an electrical supply socket or the like within an inner volume of a space partition. The term "electrical socket" is herein taken to include all types of power supply socket, communications or computer system connectors. Furthermore, the invention may equally be applied to any other non-electrical connectors, for example, for connecting to supplies or networks carrying fluids such as compressed air, gas, water and the like.

Figure 11A:
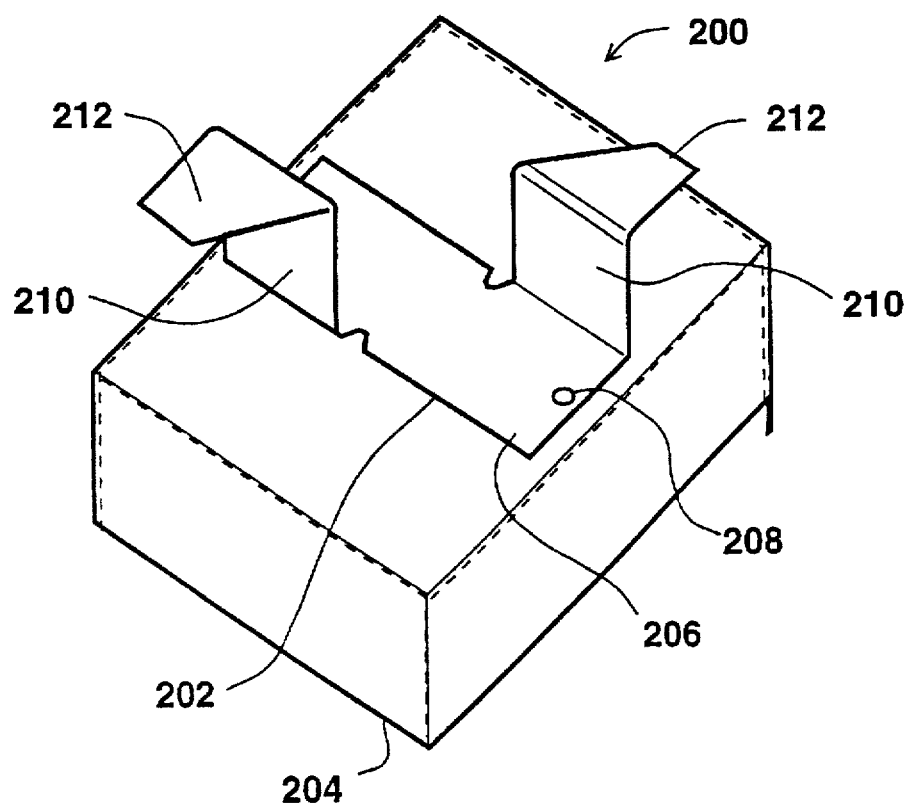
FIG. 11A is a perspective view of the back of an electrical socket assembly, constructed and operative according to the teachings of the present invention, the electrical socket assembly having a bracket for attachment to a cross member.
Figure 11B:
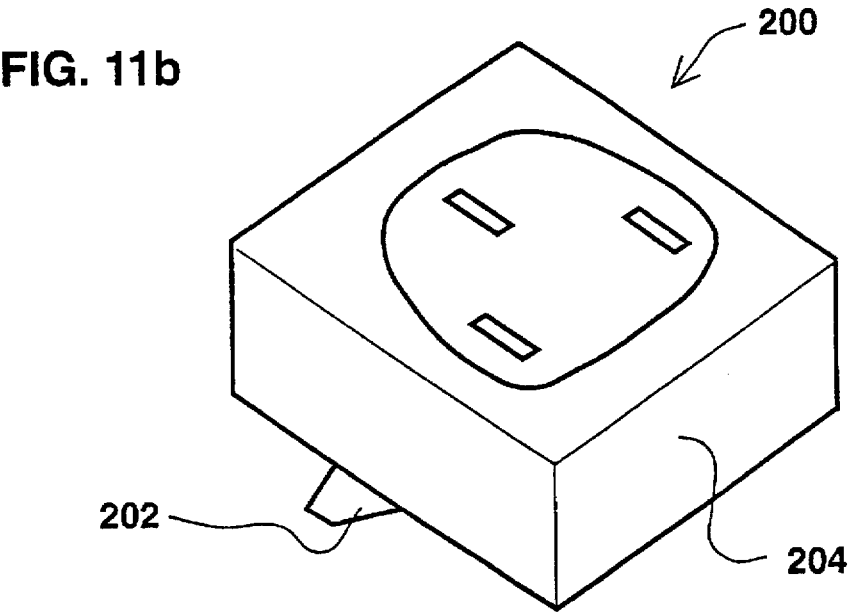
FIG. 11B is a perspective view of the front of the electrical socket assembly of FIG. 11A.

FIGS. 11A and 11B show an electrical socket assembly, generally designated 200, constructed and operative according to the teachings of the present invention. In general terms, electrical socket assembly 200 has a bracket 202 attached to an electrical socket 204. Bracket 202 is shaped such that, when in a first orientation, bracket 202 is insertable between a pair of parallel rods 102 and, when rotated to a second orientation, bracket 202 engages the pair of parallel rods 102 so as to maintain socket 204 in a fixed position.

Electrical socket 204 is essentially similar to a conventional electrical socket, typically made of plastics.

Bracket 202 is typically formed from a substantially Z-shaped piece of metal, bent in a manner as will now be described. The term "Z-shaped" is used herein to signify any form with an elongated central section having two substantially symmetrical extensions therefrom, the extensions originating near opposite ends of the central section and from opposite sides. It will be appreciated that an equivalent structure could alternatively be produced from molded plastics, or any other material of suitable structural properties and rigidity.

Bracket 202 has a base 206 which is attached to electrical socket 204 by adhesive. Alternatively, attachment may be achieved by use of screws or bolts through openings 208 in base 206. Base 206 has a width, w, similar to, or slightly less than, the spacing between pair of parallel rods 102 in the framework of the space partition. The length, l, of base 206 is preferably at least twice the width, w, and typically about three times greater. Two flat arm pieces 210 extend perpendicular to the plane of base 206, one from each side and from near to opposite ends of base 206. Arm pieces 210 extend away from electrical socket 204 to a depth equal to the thickness of rods 102, at which point they fold outwards in a plane parallel to that of base 206 to form locking surfaces 212. Locking surfaces 212 are angled or tapered towards the direction of the ends of base 206.

Figure 12A:
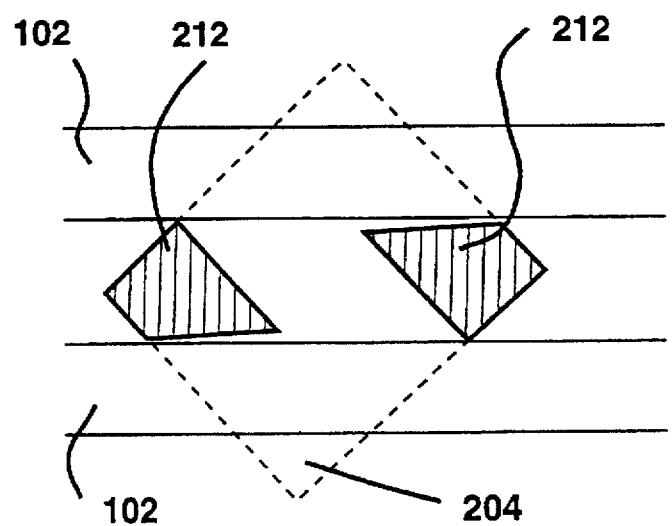
FIG. 12A is a schematic plan view of the bracket of FIG. 11A in a first orientation for insertion between parallel rods of a cross member.
Figure 12B:
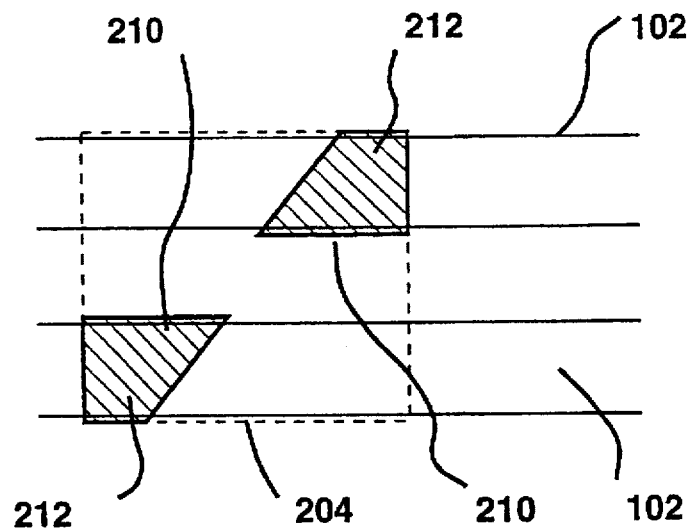
FIG. 12B is a schematic plan view of the bracket of FIG. 11A in a second orientation, fixed to parallel rods of a cross member.

FIGS. 12A and 12B illustrate the attachment of electrical socket assembly 200 (represented by dashed outline) to a pair of parallel rods 102. FIG. 12A shows the position of locking surfaces 212 when electrical socket assembly 200 is in a first orientation. In this position, locking surfaces 212 present a profile falling within the gap between rods 102. This allows bracket 202 to be inserted between rods 102. Once bracket 202 is fully inserted, electrical socket assembly 200 is rotated to a second orientation as shown in FIG. 12B. In this position, locking surfaces 212 engage the underside of rods 102, thereby maintaining electrical socket 204 in a fixed position. Arm pieces 210, abutting rods 102, prevent electrical socket assembly 200 from being rotated beyond the desired position.

Figure 14A:
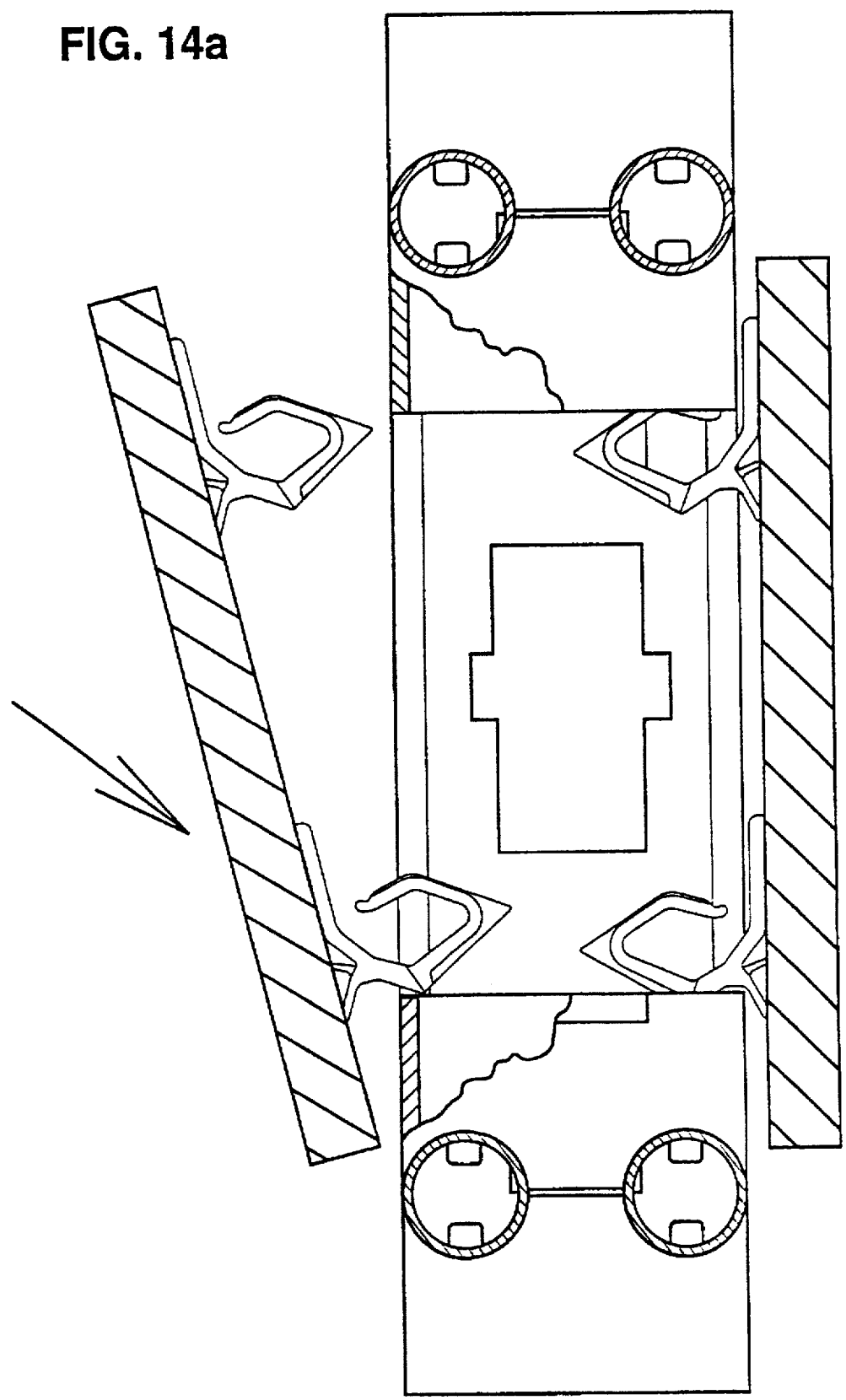
FIG. 14A is a schematic side cross-sectional view of a second embodiment of a space partition constructed and operative according to the present invention, showing a clip-out panel assembly being attached bottom first to a space partition framework.
Figure 14B:
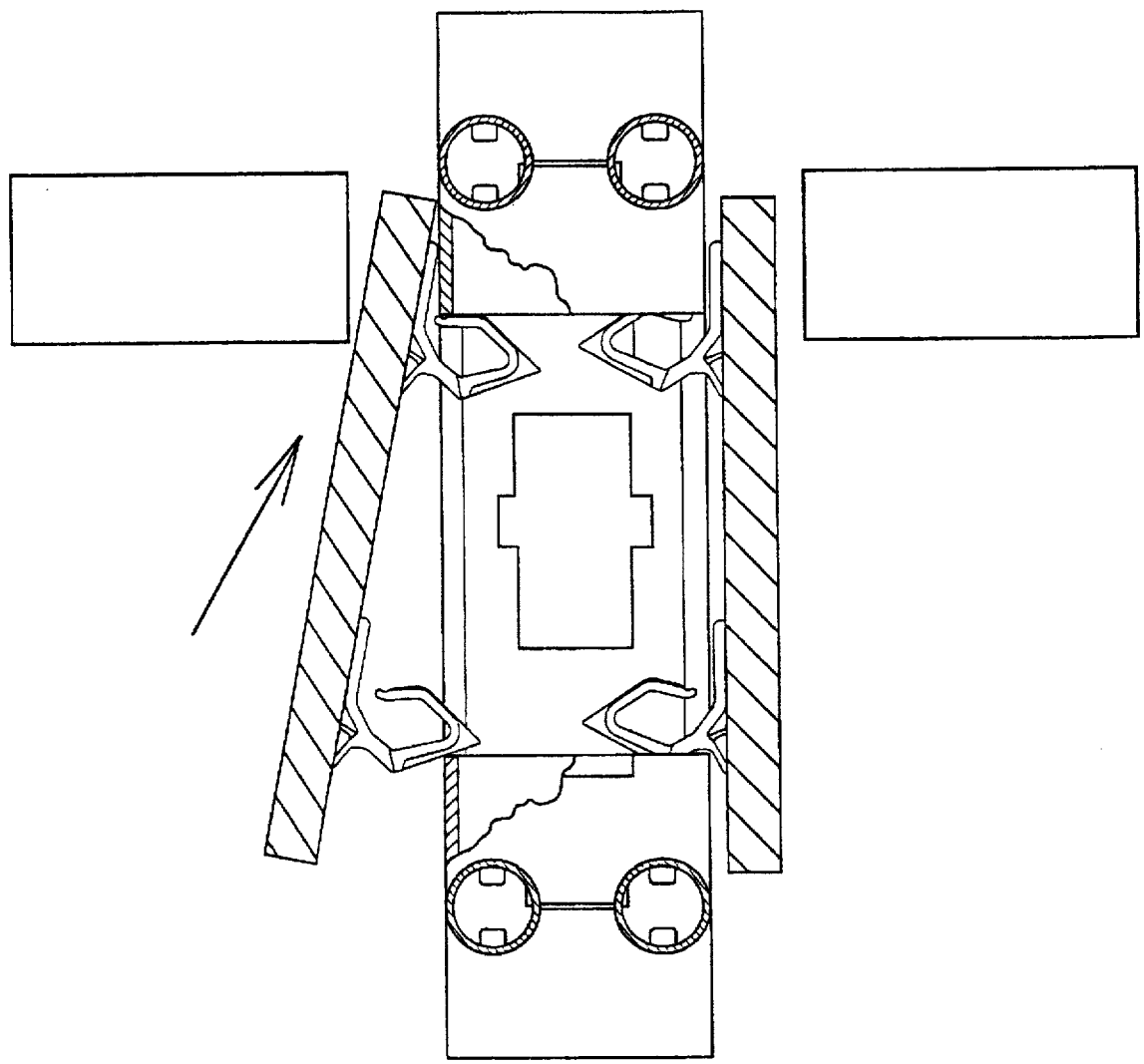
FIG. 14B is a schematic side cross-sectional view of the space partition of FIG. 14A, showing the clip-out panel assembly being attached top first to the space partition.
Figure 14C:
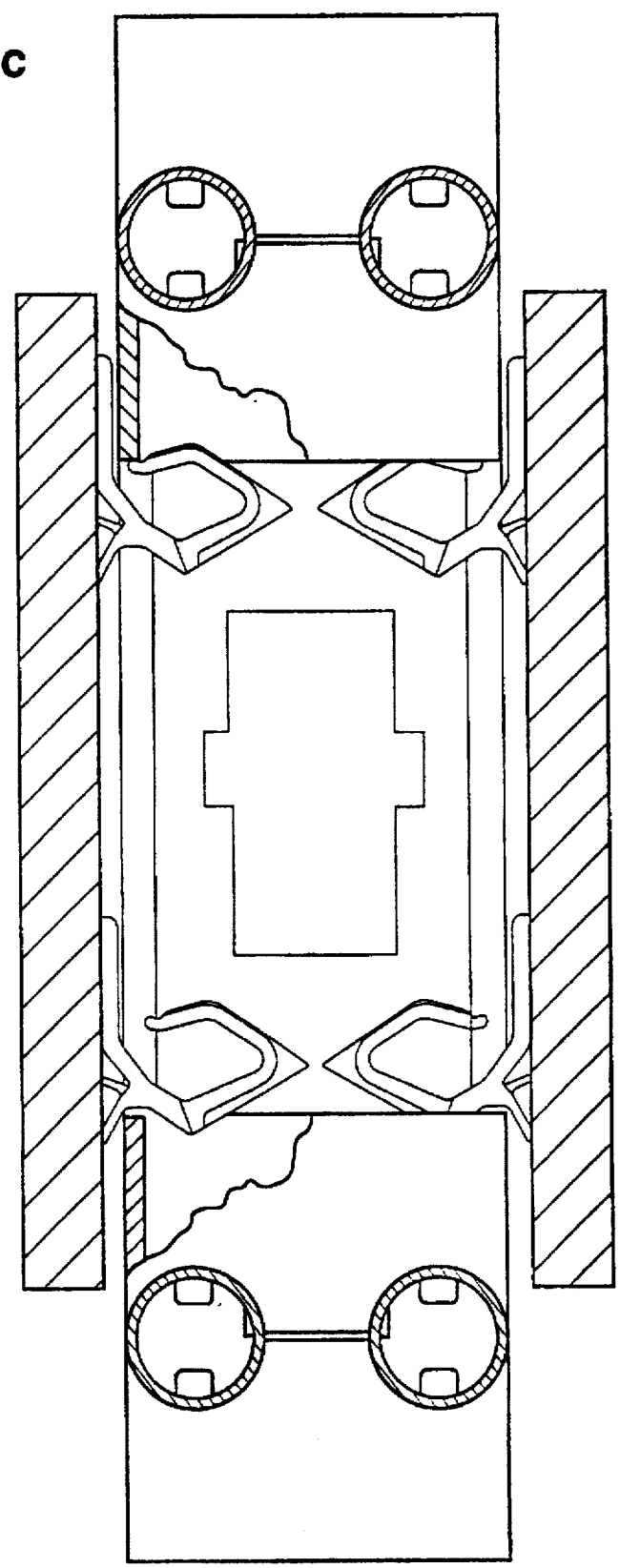
FIG. 14C is a schematic side cross-sectional view of the space partition of FIG. 14A, showing the clip-out panel assembled on the space partition.
Figure 15:
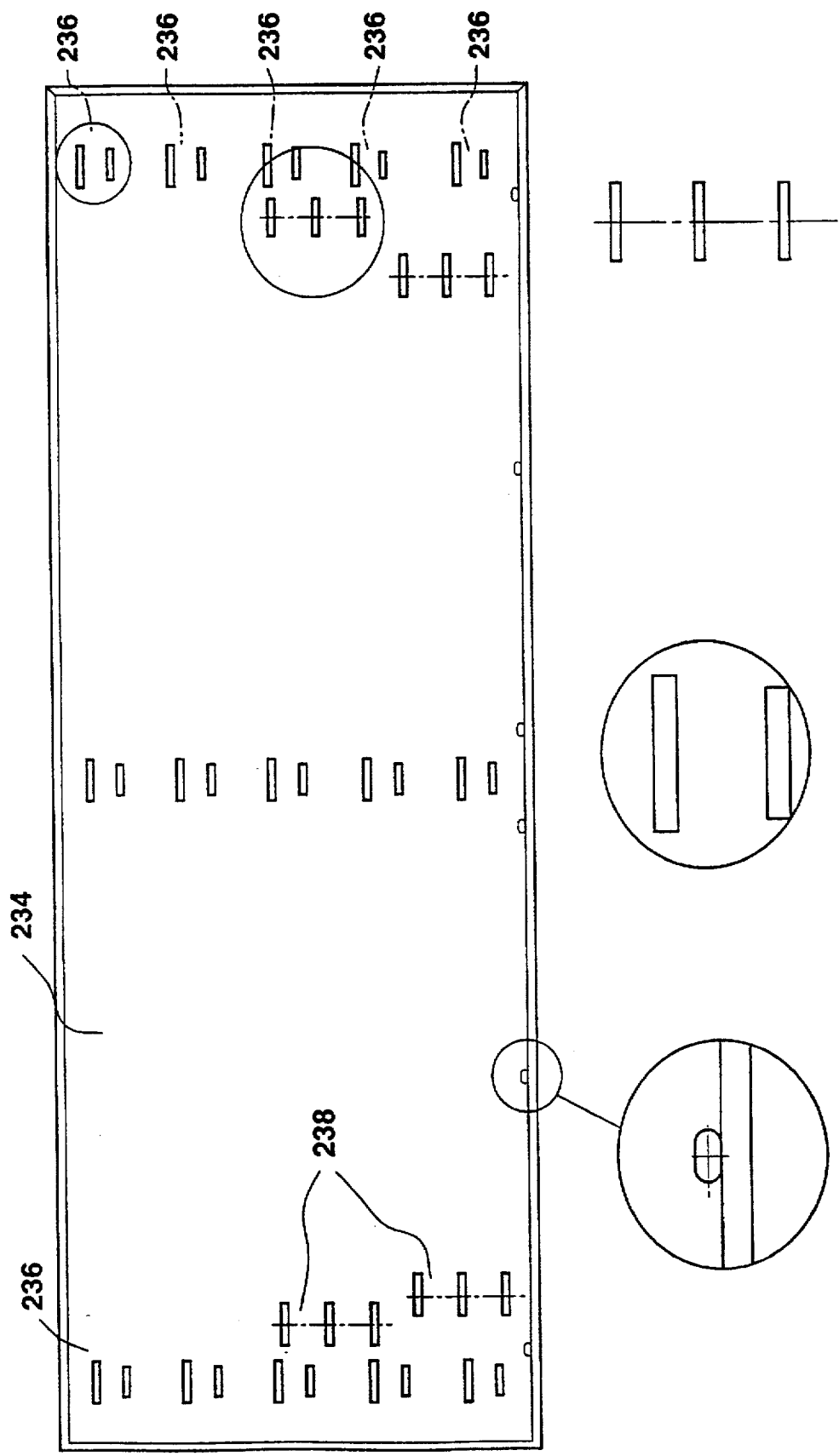
FIG. 15 is a view of the back surface of a panel for use with both the first and second embodiments of the present invention, showing a plurality of slots.
Figure 16D:
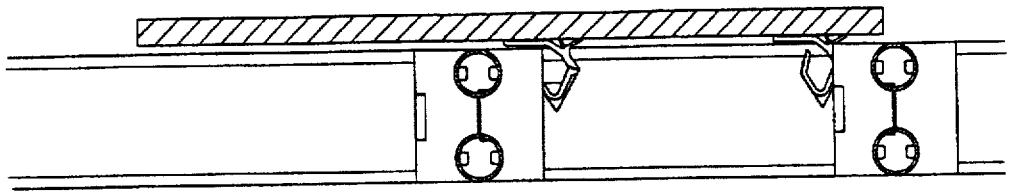
FIGS. 16A–16D are side cross-sectional views illustrating the use of the panel of FIG. 15 with the second embodiment of the present invention.
Figure 16C:
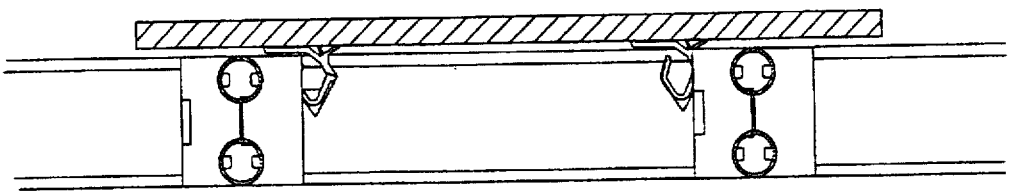
Figure 16B:
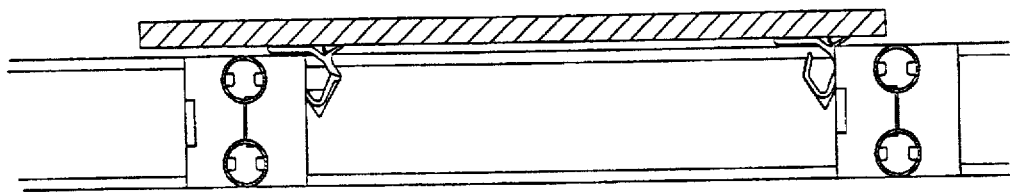
Figure 16A:
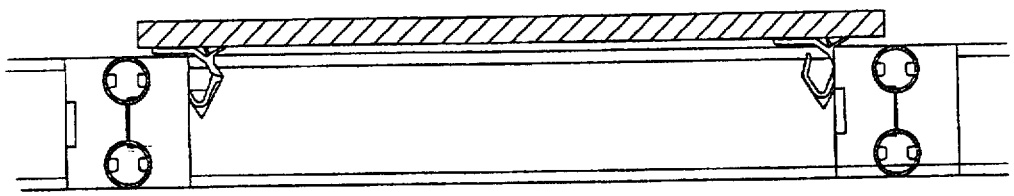
Figure 17D:
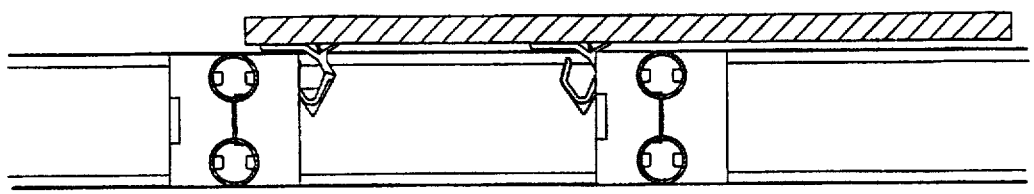
FIGS. 17A–17D are side cross-sectional views illustrating the use of the panel of FIG. 15 with the second embodiment of the present invention.
Figure 17C:
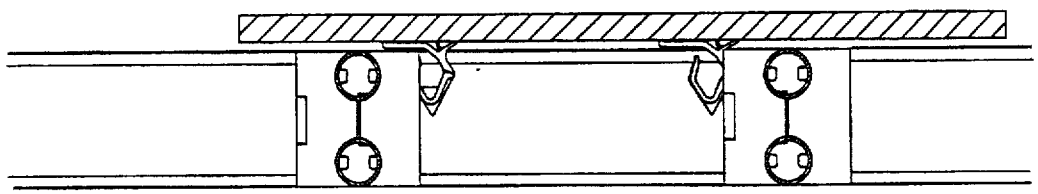
Figure 17B:
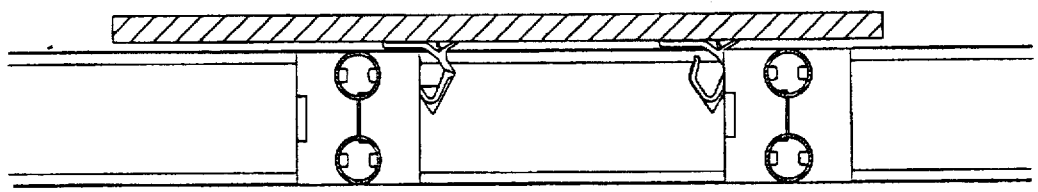
Figure 17A:
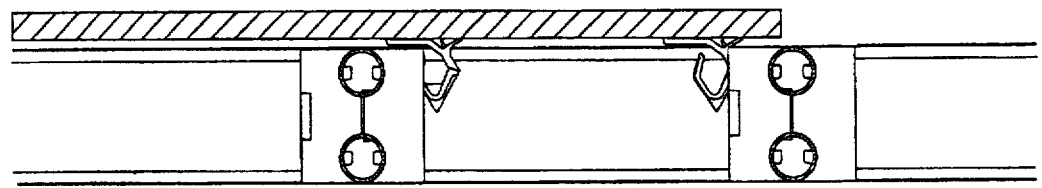

Turning now to FIGS. 13 to 15, a second embodiment of a space partition according to the teachings of the present invention will now be described. Generally speaking, the second embodiment of a space partition according to the teachings of the present invention provides a clip-out panel assembly which includes a plurality of clips attached to a panel. The clips are formed with a rigid downward facing hook and an upwardly bearing resilient catch. The downward facing hook of those clips nearer the bottom of the panel engage a lower cross member, thereby supporting the weight of the panel. The upwardly bearing resilient catch of those clips nearer the top of the panel retains the panel against an upper cross member.

Preferably, the clip-out panel assembly has two modes of fixing and removal. Firstly, the clip-out panel assembly is easily fixed by resting the downward facing hooks of the clips near the bottom of the panel on the lower cross member, and pushing on the upper edge of the panel until the upwardly bearing resilient catches engage the upper cross member. Alternatively, the panel can be fixed top first by positioning the upwardly bearing resilient catches against the upper cross member and forcing the bottom edge of the panel inwards and upwards, thereby flexing the resilient catches sufficiently to allow the downward facing hooks of the clips near the bottom of the panel to engage the lower cross member. The two modes of fixing and removal allow panels to be removed quickly and simply from above and below furnishings and other accessories fixed or adjacent to the partition, thereby providing convenient access to the inner volume of the space partition while causing minimum disruption.

Figure 13A:
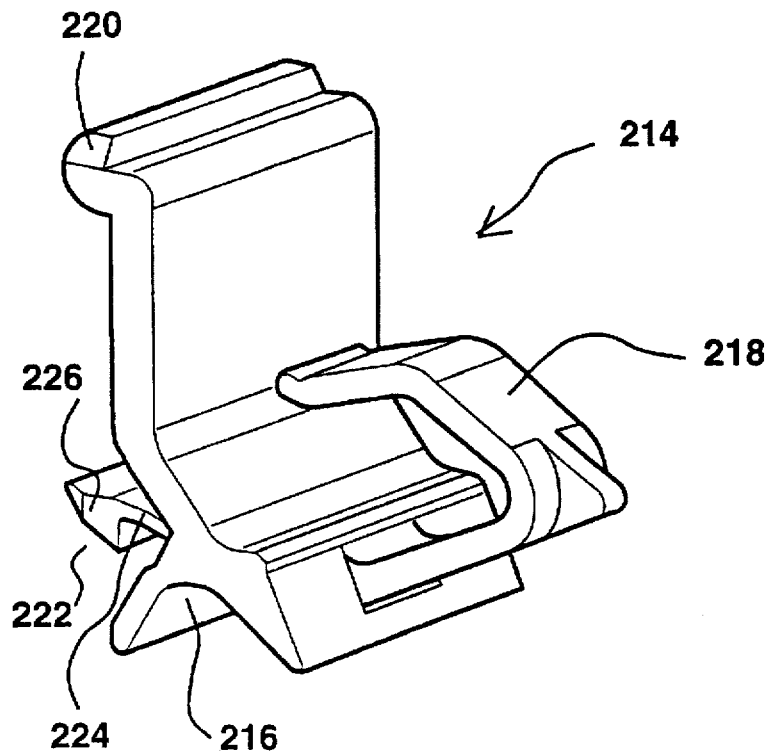
FIG. 13A is a perspective view of a clip for use in a second embodiment of a space partition constructed and operative according to the present invention.
Figure 13B:
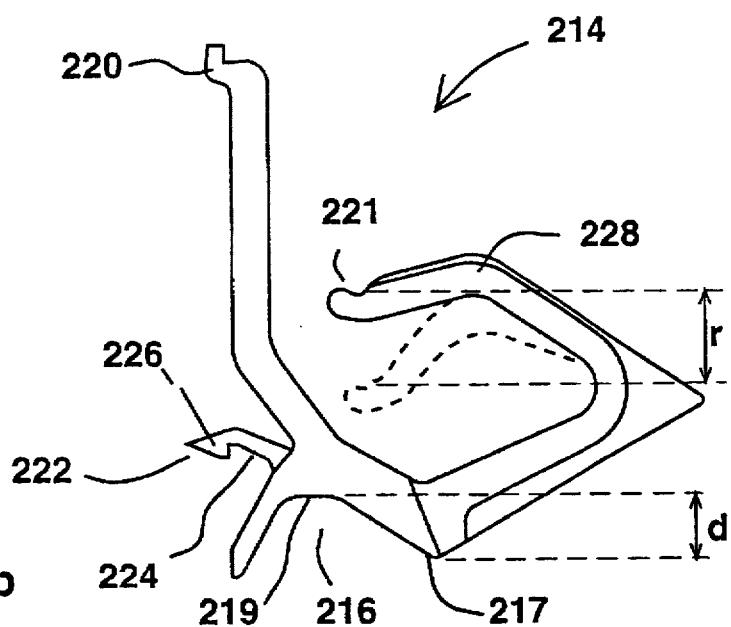
FIG. 13B is a side view of the clip of FIG. 13A.

With reference now to FIGS. 13A and 13B, there is shown a clip, generally designated 214, for use in the second embodiment of a space partition according to the teachings of the present invention. Clip 214 features a downward facing hook 216, an upwardly bearing resilient catch 218, and attachment tabs 220 and 222.

Clip 214 has a unitary structure typically molded from plastics or similar material. The material is chosen such that, by varying the thickness and/or width of different parts of clip 214, certain parts can be made substantially rigid while other parts are significantly flexible. Thus, downward facing hook 216 extends across the full width of clip 214 and is formed from relatively thick material so as to be substantially rigid and sufficiently strong to support the weight of a panel. In contrast, upwardly bearing resilient catch 218 is formed as a narrow projection, typically about a third of the width of clip 214, so as to be somewhat flexible.

FIG. 13B additionally shows definitions of the depth, d, of downward facing hook 216, and the range of flexibility, r, of upwardly bearing resilient catch 218. Depth, d, is the distance measured vertically, i.e., in the plane of the panel to which clip 214 is to be attached, between the front edge 217 of downward facing hook 216 and the highest point 219 of the arch of downward facing hook 216. Depth, d, thus defined, corresponds to the vertical movement necessary to free clip 214 from an edge on which it is resting. Range of flexibility, r, is the distance measured vertically, i.e., in the plane of the panel to which clip 214 is to be attached, between the position of a rear-facing part 221 of upwardly bearing resilient catch 218 when resilient catch 218 is in its unflexed state and when it is flexed firmly downwards. Range of flexibility, r, thus defined, corresponds to the extent of vertical movement possible while clip 214 is retained under an edge. It will now be readily apparent that, in order to insert or remove a panel top first, range, r, must be at least as large as depth, d.

Attachment tabs 220 and 222 allow easy attachment of clip 214 to a panel by means of slots provided in the panel for this purpose. Tab 220 is rigid, clip 214 requiring rotation so that tab 220 may be inserted into a first slot. With tab 220 inserted, clip 214 is then turned until tab 222 engages in a second slot. Tab 222 has a thin portion 224 and a barb 226. Thin portion 224 provides the flexibility for barb 226 to ride over the edge of the second slot and lock against it, thereby securing clip 214 to a panel.

The two modes of insertion and removal of a panel employing the clip-out panel assembly of the present invention will now be illustrated with reference to FIGS. 14A–14C. FIG. 14A shows a clip-out panel assembly, generally designated 228, including a panel 230 with two clips 214 being attached bottom first to a space partition framework 232. Downward facing hook 216 of the lower clip 214 is first engaged against a connector piece 109 of a lower cross member 100, thereby supporting panel 230. The upper part of panel 230 is then pushed against space partition framework 232 so that upwardly resilient catch 218 engages a lower edge of a connector piece 109 of an upper cross member 100, thereby retaining panel 230 against space partition framework 232.

Clip-out panel assembly 228 is easily removed by reversal of the above procedure, by gently pulling on the upper edge of panel 230, thereby disengaging upwardly bearing resilient catch 218 from connector piece 109 of upper cross member 100. Panel 230 can then be lifted out, away from space partition framework 232, to provide convenient access to the inner volume of the space partition.

FIG. 14B shows panel 230 being attached top first to space partition framework 232. In this case, the upper part of panel 230 is first positioned against space partition framework 232 so that upwardly facing resilient catch 218 is engaged under a lower edge of connector piece 109 of upper cross member 100. Panel 230 is then forced upwards and inwards towards space partition framework 232 so as to compress upwardly facing resilient catch 218 sufficiently to allow the front edge 217 of downward facing hook 216 of lower clip 214 to ride over the edge of connector piece 109 of lower cross member 100.

FIG. 14C shows panel 230 attached to space partition framework 232. In this position, downward facing hook 216 of lower clip 214 is engaged against connector piece 109 of lower cross member 100, thereby supporting the weight of panel 230. Upwardly facing resilient catch 218 of upper clip 214 retains the panel against connector piece 109 of upper cross member 100.

Referring now to FIG. 15, this shows the rear surface of a panel 234 for use interchangeably with the first and second embodiments of the present invention. Panel 234 features a plurality of pairs of slots 236 for receiving clips 214. Pairs of slots 236 are positioned near the bottom of panel 234 near each corner and, in the case of a long panel, also in the middle of its length. Corresponding pairs of slots 236 are also provided near the top edge of panel 234.

Preferably, the rear surface of panel 234 is provided with a plurality of slots 236 for attachment of clips 214, slots 236 being positioned such that clips 214 may be attached to panel 234 at any of a number of vertical positions. Thus, in this example, the rear surface of panel 234 features pairs of slots 236 arranged in five rows: slots 236a closely adjacent to the upper edge of panel 234; slots 236b slightly below slots 236a; slots 236c near the middle of the height of panel 234; slots 236d slightly below slots 236c; and slots 236e closely adjacent to the lower edge of panel 234. Obviously, the precise number and spacing of rows of slots 236 may be varied according to the size and intended application of panel 234.

The significance of the multiple rows of slots 236 will now be illustrated with reference to FIGS. 16 and 17. FIGS.

16A–16D show space partition framework 232 with two cross members 100 connected at different vertical positions. In each case, it is possible to attach panel 234 at the required vertical position by locating clips 214 in appropriately chosen slots 236.

FIGS. 17A–17D show panel 234 attached to space partition framework 232 which includes two cross members 100 at given vertical positions. Although the positions of the cross members 100 remain fixed, panel 234 may be attached at whatever height required by locating clips 214 in appropriately chosen slots 236.

To enable panel 234 to be used in swing-out panel assembly 150, panel 234 preferably also features sets of three slots 238 for attachment of clip-on hinge pieces 184. Two sets of three slots 238 are arranged symmetrically near opposite ends of panel 234. Again, additional sets of slots are preferably provided to allow use of panel 234 with cross members in different positions.

Turning now to the third embodiment, this will be described with reference to FIGS. 18 to 24. In general terms, the third embodiment of a space partition according to the teachings of the present invention has a modular trim assembly such that the same elements can be used to provide a top to the space partition and a plinth along its lower edge. The modular trim assembly also allows the trim to be easily removed to provide convenient access to an inner volume of the space partition.

Figure 18A:
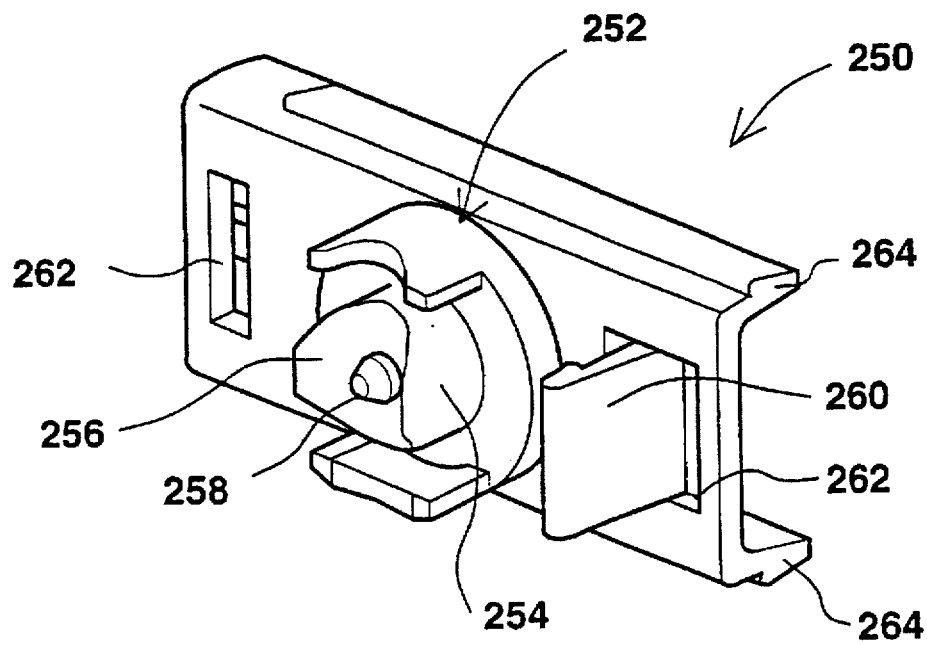
FIG. 18A is a perspective view of the back of a trim support for use in a third embodiment of a space partition constructed and operative according to the present invention.
Figure 18B:
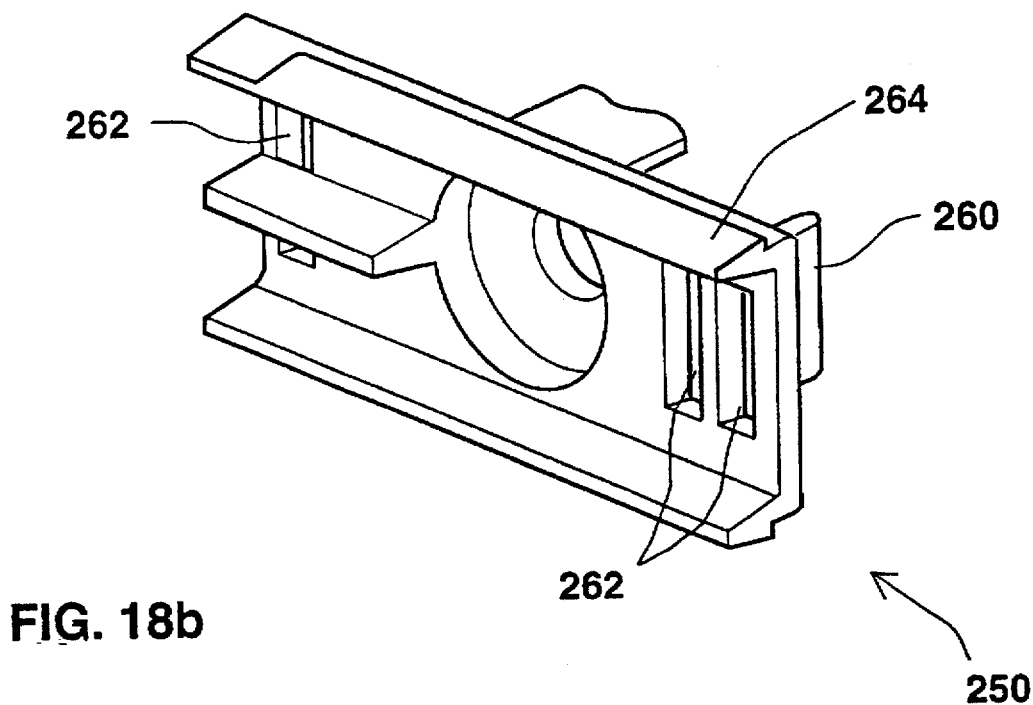
FIG. 18B is a perspective view of the front of the trim support of FIG. 16A.

FIGS. 18A and 18B show a trim support 250 for use in the modular trim assembly of the present invention. It is a particular feature of trim support 250 that it is mountable both at the top of the space partition framework and near its lower edge, so as to provide a correctly oriented support for a piece of trim in either position. To this end, trim support 250 features a mounting block 252 which includes a substantially cylindrical projection 254 terminating in a concave surface 256 of cylindrical form. Concave surface 256 preferably features a locating projection 258. The significance of these features will be described with reference to FIGS. 21 and 22 below.

Trim support 250 also features a flexible clip 260 and a number of slots 262 for fixing trim support 250 in position, as will be described with reference to FIGS. 21 and 22 below.

To receive a piece of trim, the sides of trim support 250 form a pair of rails 262. Projecting ridges 264 are provided along the length of rails 262 for retaining the piece of trim.

Figure 19A:
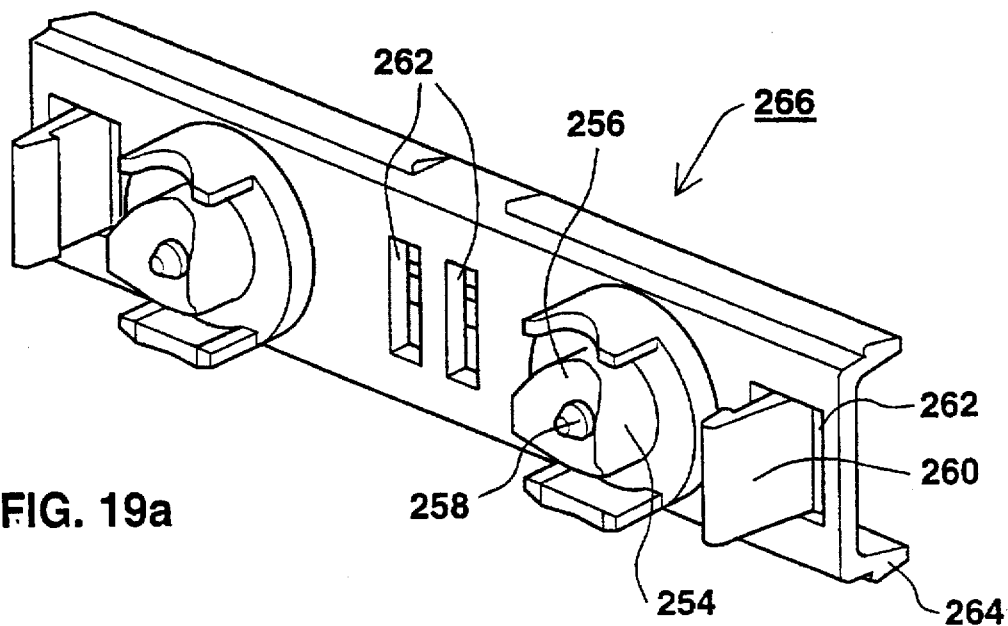
FIG. 19A is a perspective view of the back of a double length trim support for use in a third embodiment of a space partition constructed and operative according to the present invention.
Figure 19B:
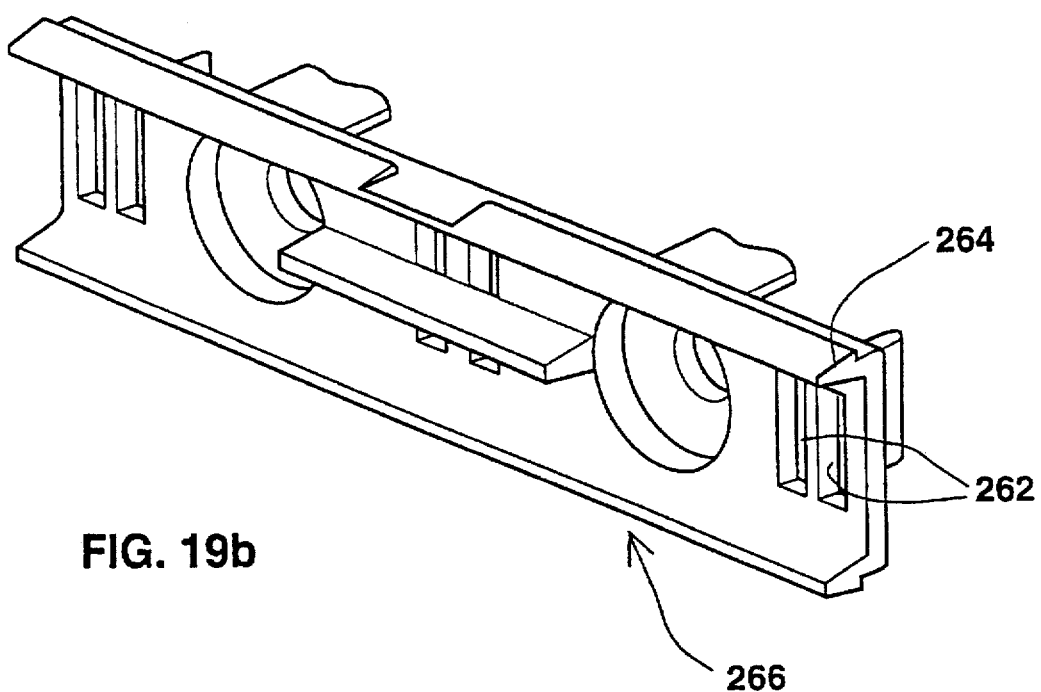
FIG. 19B is a perspective view of the front of the trim support of FIG. 17A.

FIGS. 19A and 19B show a double length trim support 266 for use in extended sections of a space partition, as will be described with reference to FIG. 23 below. The features of double length trim support 266 are similar to the features of trim support 250 and equivalent features are labelled similarly.

Figure 20:
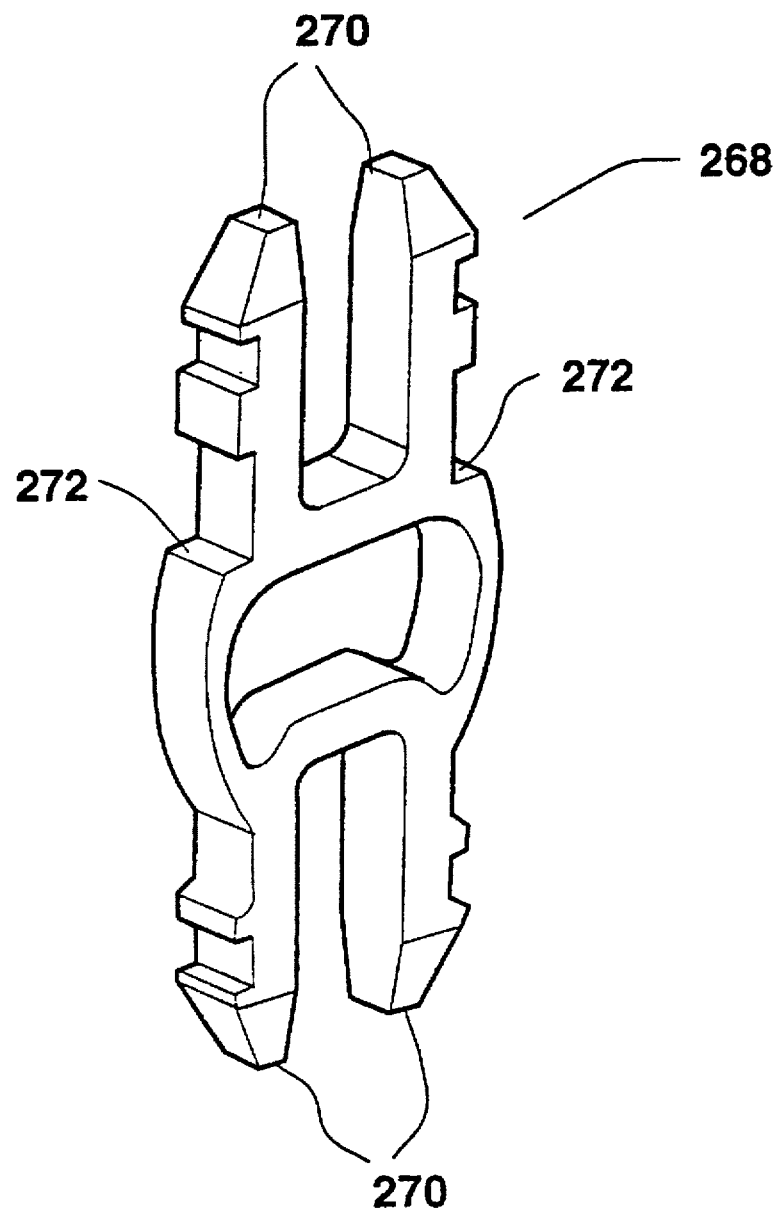
FIG. 20 is a perspective view of a clip for use with the trim supports of FIGS. 16A and 17A.

FIG. 20 shows a double-ended clip 268 for use with trim supports 250 and 266. Double-ended clip 268 has a pair of parallel, somewhat flexible, outwardly barbed prongs 270 extending in two opposite directions. At the base of one pair of prongs 270, double-ended clip 268 has two protruding shoulders 272. The significance of these features will be described with reference to FIGS. 21 and 22 below.

Figure 21:
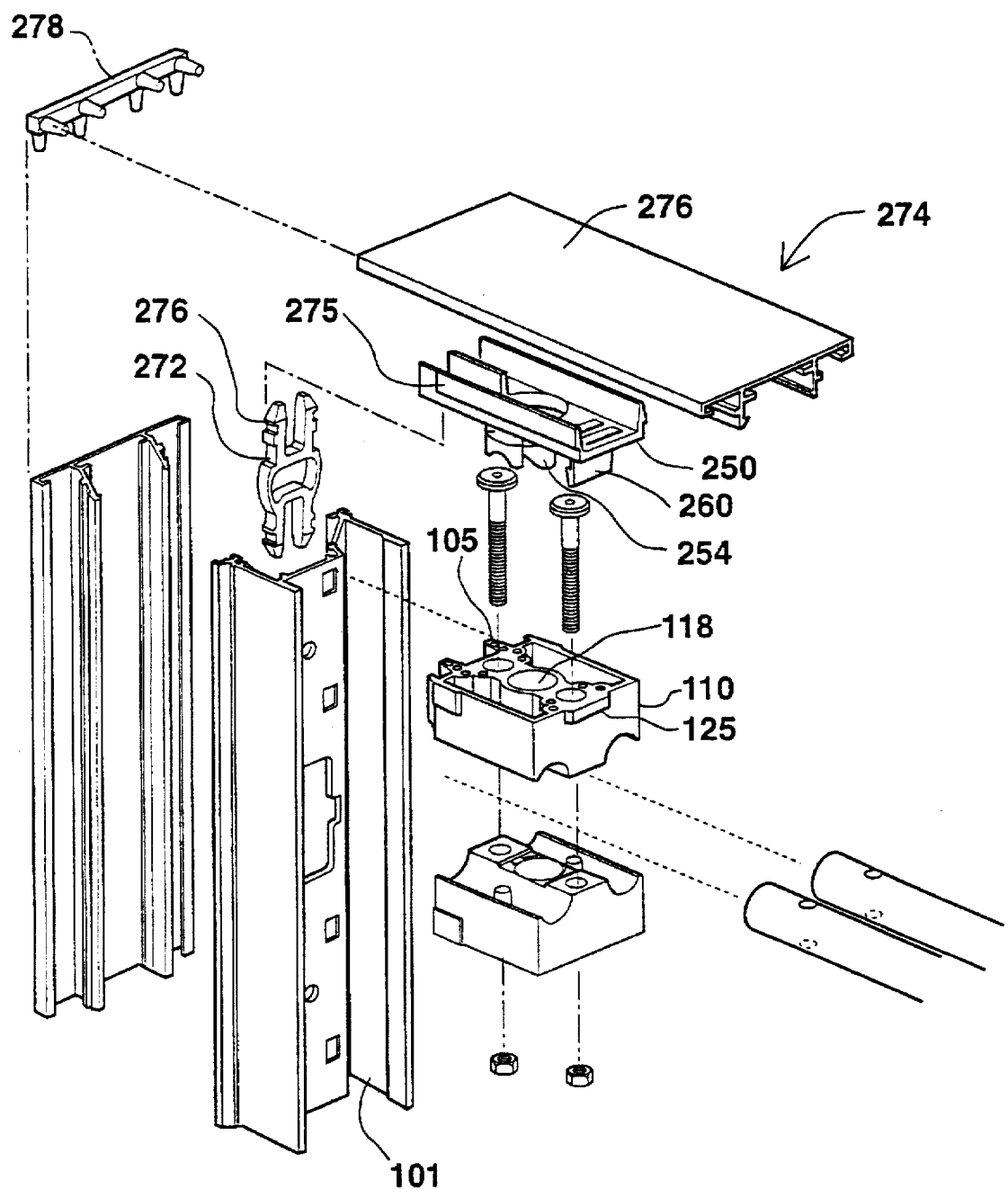
FIG. 21 is an exploded perspective view of the third embodiment of a space partition, constructed and operative according to the teachings of the present invention, in which a modular trim assembly is used to form a top to the space partition.

Turning now to FIG. 21, there is shown a modular trim assembly, generally designated 274, serving as a top of a space partition. The framework of the space partition is constructed as in FIG. 2 above. Double-ended clip 268 is then positioned on the outer side of vertical member 101 such that protruding shoulders 272 abut the ends of prongs 105 of upper connector 110. Trim support 250 is then pushed downwards into position such that cylindrical projection 254 engages opening 118, flexible clip 260 catches on to tab 125 and barbed prongs 270 of double-ended clip 268 engage in one of slots 262. In this way, trim support 250 is fixed so that it provides upward facing, horizontal rails 275 on to which a piece of trim 276 is clipped. Trim 276 is preferably interchangeable with cover piece 126 as shown in FIG. 8, catches 128 being provided with an internal ridge 129 for clipping on to projecting ridges 264.

If vertical member 101 is to be at one end of the space partition, a suitably shaped corner piece 278 is used to close between piece of trim 276 and cover piece 126. If the space partition extends beyond vertical member 101, a connector piece (not shown) is used to close between adjacent pieces of trim 276. Alternatively, a single elongated piece of trim may span several space partition framework units, supported at multiple positions thereon.

Figure 22:
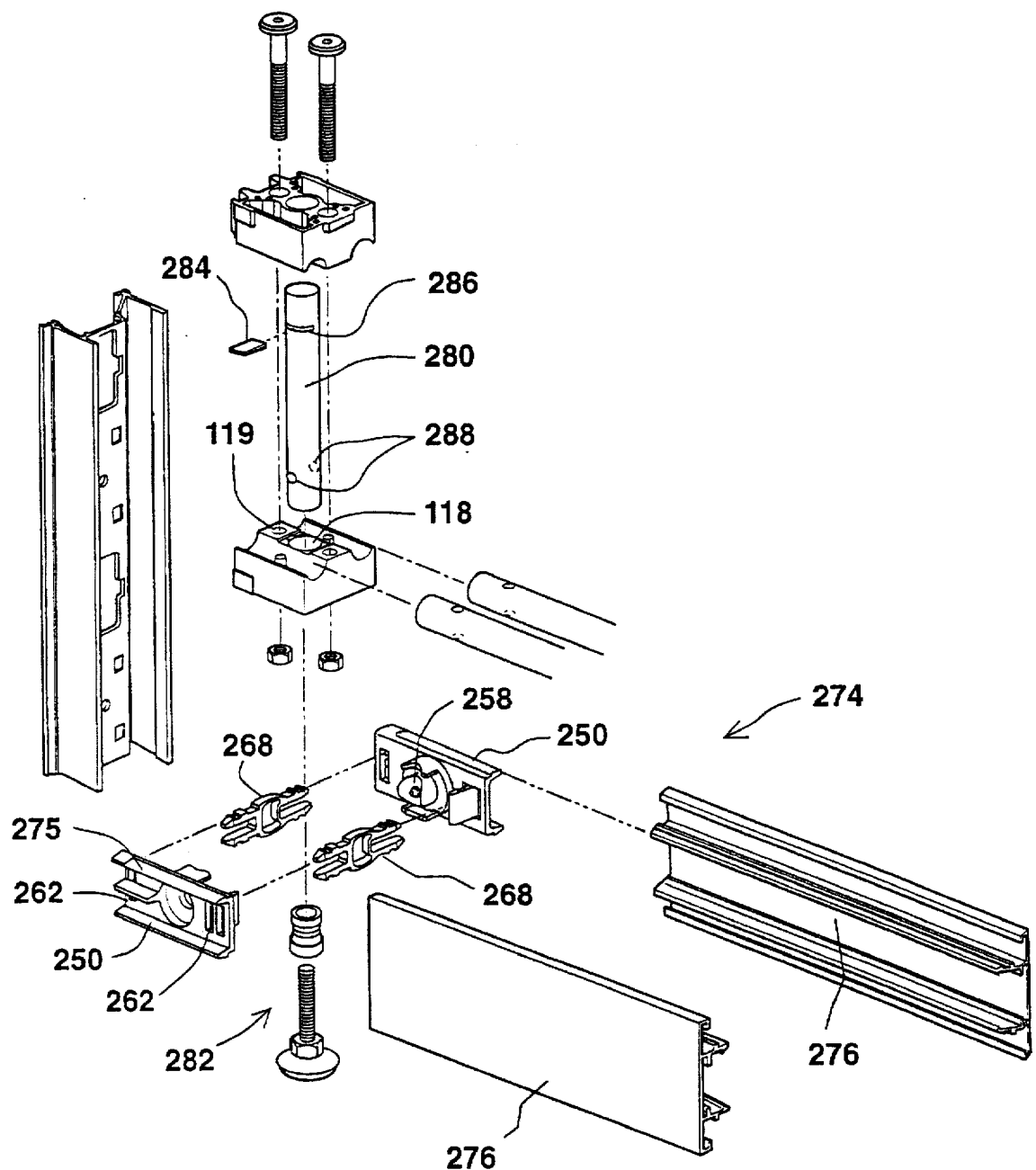
FIG. 22 is an exploded perspective view of the third embodiment of a space partition, constructed and operative according to the teachings of the present invention, in which a modular trim assembly is used to form a plinth along the space partition.

Turning now to FIG. 22, modular trim assembly 274 is shown serving as a plinth along the lower edge of a space partition. The framework of the space partition is constructed as in FIG. 2 above, with the addition of a vertical pole 280, located within opening 118, serving as a supporting leg for the space partition, and an adjustable foot pad 282 attached to the base of vertical pole 280. Vertical pole 280 is secured against slipping through opening 118 by a rigid tongue 284 mounted in slot 119 and engaged in a recess 286 in vertical pole 280.

Modular trim assembly 274 is then attached to vertical pole 280. In this case, two opposing trim supports 250 and two double-ended clips 268 are used. Both trim supports 250 are positioned with concave surfaces 256 facing vertical pole 280 and with double-ended clips 268 aligned between slots 262. As trim supports 250 are pushed together, double-ended clips 268 lock into slots 262 and locating projections 258 engage a bore or cavities 288 in vertical pole 280. In this way, trim supports 250 are fixed so that they provide outward facing, horizontal rails 275 on to which pieces of trim 276 are clipped from one or both sides.

Figure 23:
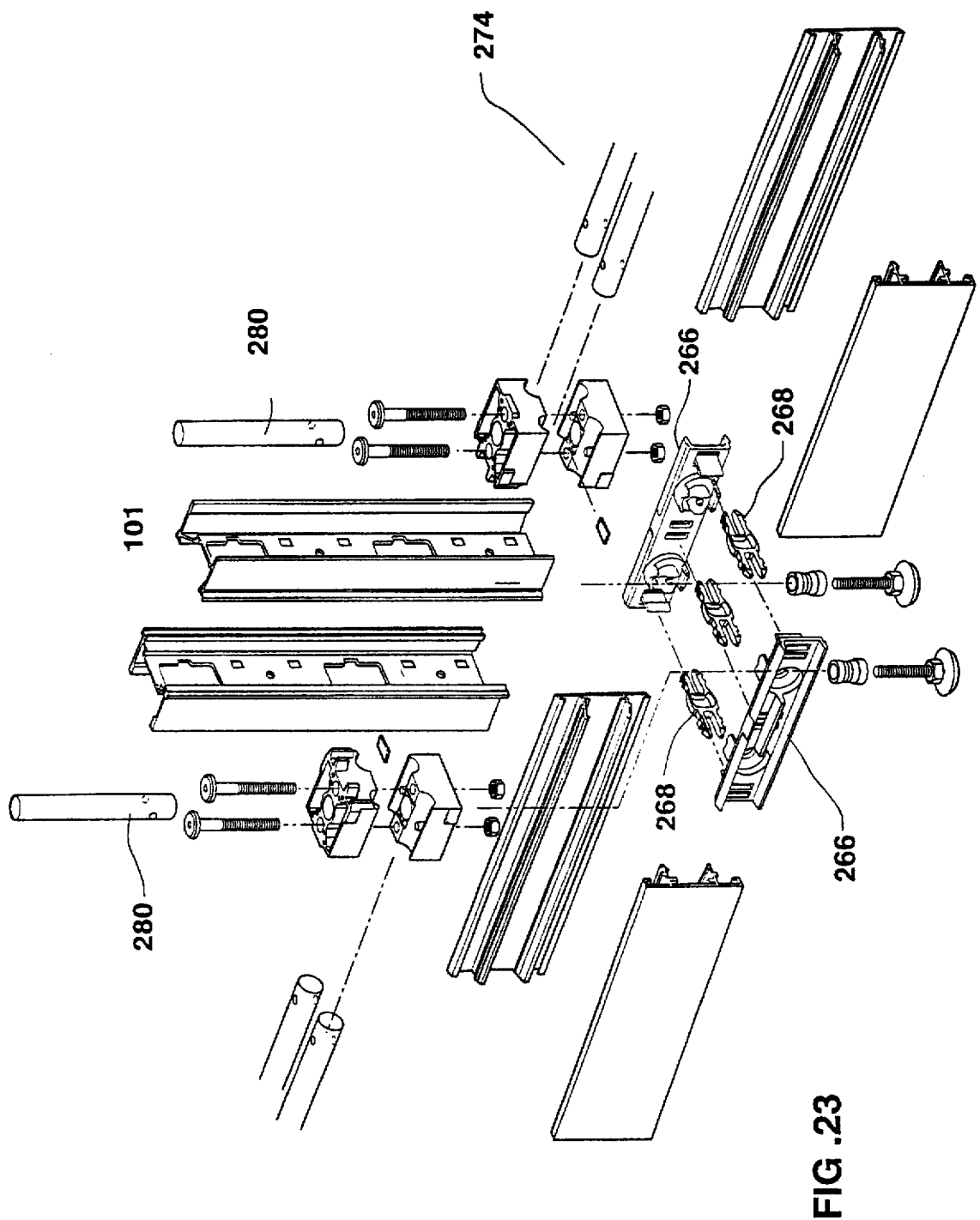
FIG. 23 is an exploded perspective view of the third embodiment of a space partition, constructed and operative according to the teachings of the present invention, in which a modular trim assembly is used to form a plinth along an extended length of the space partition.

FIG. 23 shows a variation of modular trim assembly 274 in which two double-length trim supports 266 and three double-ended clips 268 are used to form a plinth along the lower edge of an extended section of a space partition. In this case, modular trim assembly 274 clamps on to two adjacent vertical poles 280, passing beneath vertical members 101. In all other respects, the elements shown are equivalent to those shown in FIG. 22.

Modular trim assembly 274 of FIG. 23 may also be used to form a top of an extended space partition. The details of such a structure may be fully understood by analogy to FIG. 21 and the description thereof.

Figure 24:
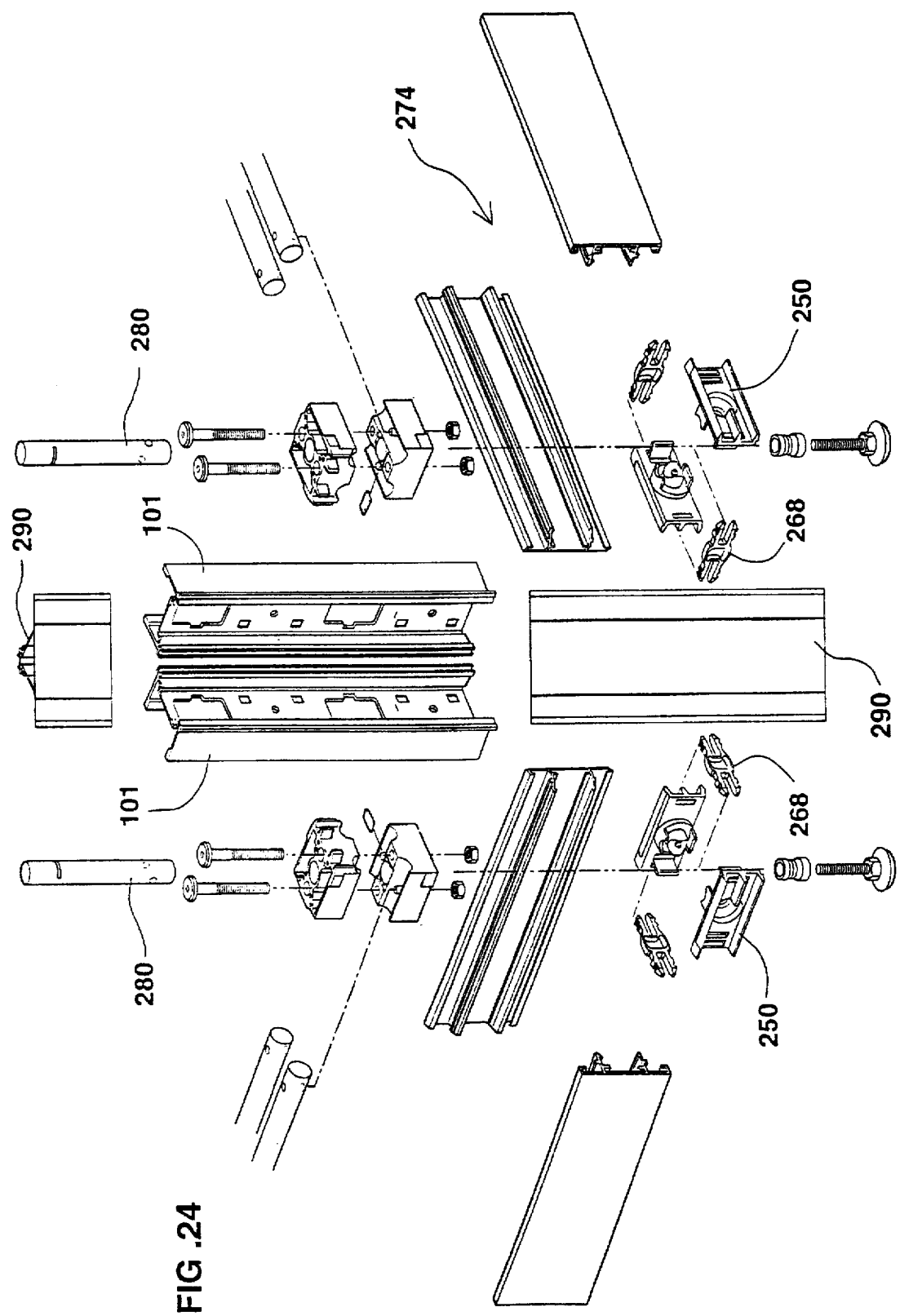
FIG. 24 is an exploded perspective view of the third embodiment of a space partition, constructed and operative according to the teachings of the present invention, in which a modular trim assembly is used to form a plinth around a corner portion of the space partition.

FIG. 24 shows a further application of modular trim assembly 274 to sections of a space partition adjacent to a corner. Each side taken alone is fully equivalent to the structure of FIG. 22. The two adjacent vertical members 101 at the corner are attached by means of a triangular adapter 290. A three- or four-way intersection can be produced in a similar manner by use of a rectangular adapter (not shown).

Finally, with reference to FIGS. 25 to 27, the fourth embodiment will now be described. Referring first to FIGS. 25A and 25B, there is shown a space partition including a pop-up cover assembly, generally designated 292, constructed and operative according to the teachings of the present invention. Generally speaking, pop-up cover assembly 292 has a primary framework 294, and a secondary framework 296 mounted within, and vertically displaceable relative to, primary framework 294. A cover 298 is attached to secondary framework 296. Secondary framework 296 may be moved vertically between a first position, as shown in FIG. 25A, in which cover 298 abuts primary framework 294 so as to conceal the inner volume, and a second position, as shown in FIG. 25B, in which cover 298 is lifted away from primary framework 294 thereby allowing access to the inner volume. Hence, this structure is referred to descriptively herein as a "pop-up cover assembly".

Relating now to the features of pop-up cover assembly 292 in more detail, primary framework 294 is typically a space partition framework as in FIG. 2 or any of the previously described embodiments.

Secondary framework 296 includes two vertical inserts 300 which are free to slide vertically within vertical members 101 of primary framework 294. Secondary framework 296 also preferably includes a cross member 302 attached to both vertical inserts 300. Cross member 302 is a variation of cross member 100.

Cross member 302 is preferably used to support electrical connectors 304, such as power sockets, computer and telephone connectors. Electrical connectors 304 are concealed while secondary framework 296 is in its first position, as shown in FIG. 25A, and may be accessed by raising secondary framework 296 to its second position, as shown in FIG. 25B. Once the required connections are made, secondary framework 296 is returned to its first position, thereby concealing electrical connectors 304 while leaving a small clearance for the passage of connected wires.

Alternatively, cross member 302 supports a shelf or other storage device (not shown) to provide easily accessible concealed storage. Such concealed storage may be valuable for a wide variety of uses. Examples include the provision of a drinks bar, normally concealed from view and yet instantly available for a special occasion or an unexpected guest.

Pop-up cover assembly 292 preferably also features a latch mechanism 306 for temporarily retaining secondary framework 296 in its raised position while access is required to the inner volume. A possible structure for latch mechanism 306 is illustrated in FIGS. 26A to 26G.

Latch mechanism 306, as shown in FIG. 26A, includes a rocker 308 mounted by means of a hinge 310 within primary framework 294. Rocker 308 has a protruding guide wheel 312 which engages a track 314 attached to secondary framework 296. As secondary framework 296 is lifted, guide wheel 312 follows track 314 as shown in FIG. 26B until it reaches the position shown in FIG. 26C, thereby preventing further extension. Then, when secondary framework 296 is released, guide wheel 312 catches under a ridge 316 of track 314 as shown in FIG. 26D, thereby temporarily retaining secondary framework 296 in its raised position.

When access to the inner volume of the space partition is no longer required, secondary framework 296 is again lifted so that guide wheel 312 follows track 314 through the position shown in FIG. 26E until it reaches the position shown in FIG. 26F. Then, when secondary framework 296 is released, track 314 directs guide wheel 312 away from ridge 316, thereby allowing secondary framework 296 to return through the position of FIG. 26G to its initial lowered position of FIG. 26A.

Figure 27A:
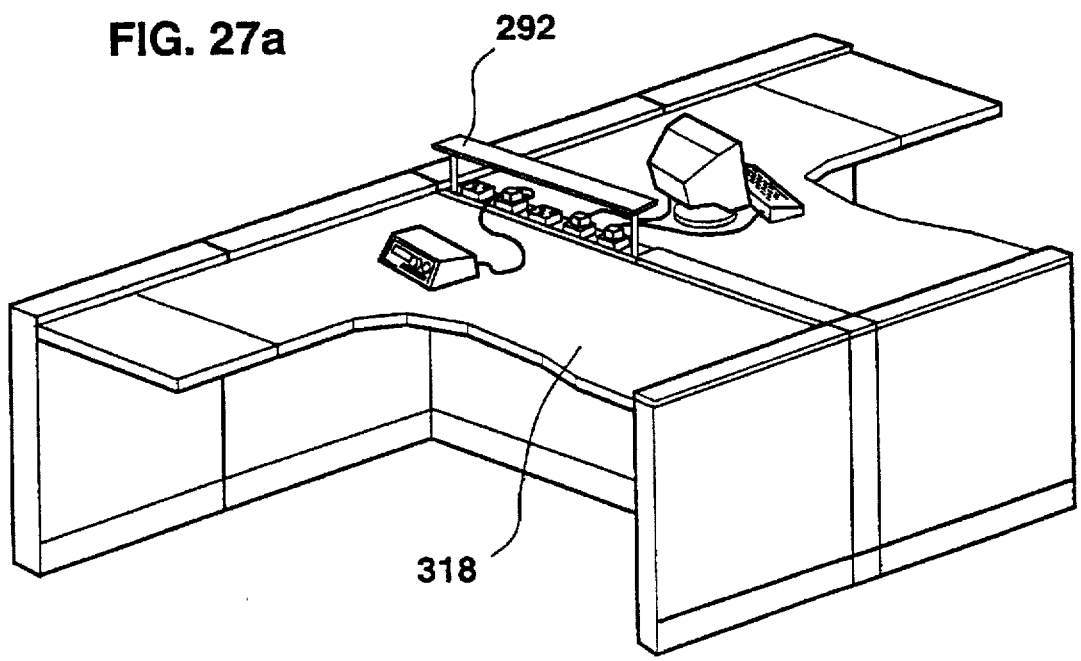
FIG. 27A is a perspective view of the space partition of FIGS. 25A and 25B in use, with the pop-up cover assembly in a raised position.
Figure 27B:
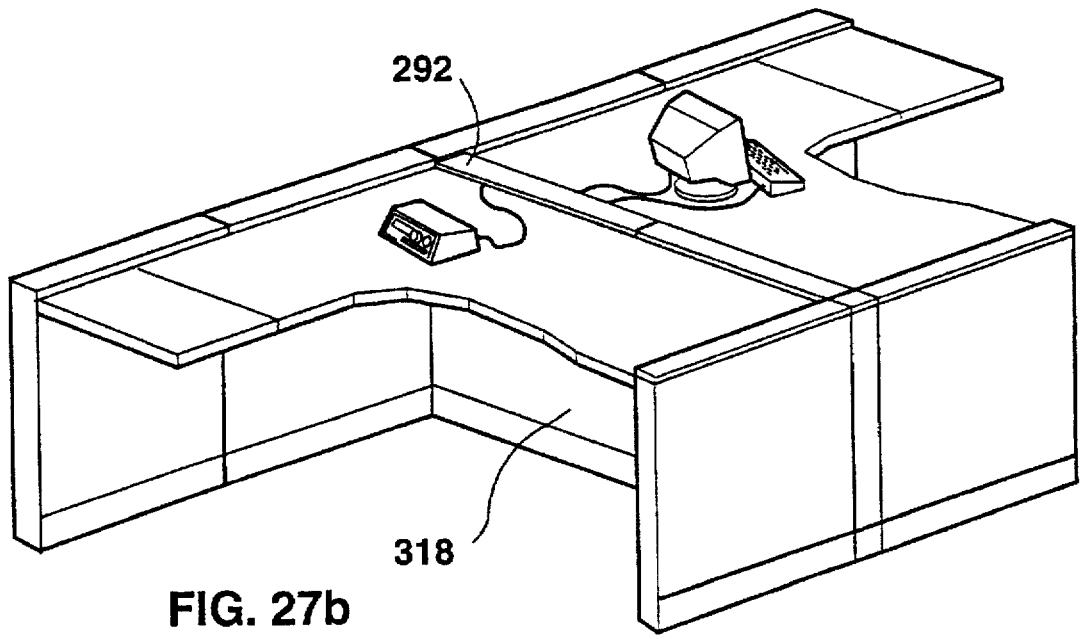
FIG. 27B is a perspective view of the space partition of FIGS. 25A and 25B in use, with the pop-up cover assembly in a lowered position.

FIGS. 27A and 27B illustrate the use of pop-up cover assembly 292 installed at desk level in a space partition system. In this example, a substantially horizontal work-top 318 is attached to primary framework 294 such that, when secondary framework 296 assumes its first position, cover 298 lies flush, or almost flush, with work-top 318, forming a substantially continuous surface therewith. The attraction of such a system is immediately self-evident, providing convenient instant access for connecting and disconnecting electrical connections, as shown in FIG. 27A, while leaving the desk-top area uncluttered and aesthetically pleasing at other times, as shown in FIG. 27B.

Turning, finally, to FIGS. 28–40, a number of important accessories for use with the space partitions of the present invention will now be described. FIGS. 28–32 illustrate the structure and use of a removable insert, generally designated 320, for varying the vertical position of cross members 100. Turning briefly back to FIGS. 1 and 2, it will be understood that the vertical position of rods 102 is fixed in relation to vertical member 101 by pins 105 engaged in slits 112. On occasions, it will occur that a cross member 100 is required around a certain height, but that the specific vertical position of rods 102 is inconvenient. In such a case, removable insert 320, is inserted between upper connector 110 and rods 102, thereby lowering rods 102 relative to the position of slits 112.

Figure 28A:
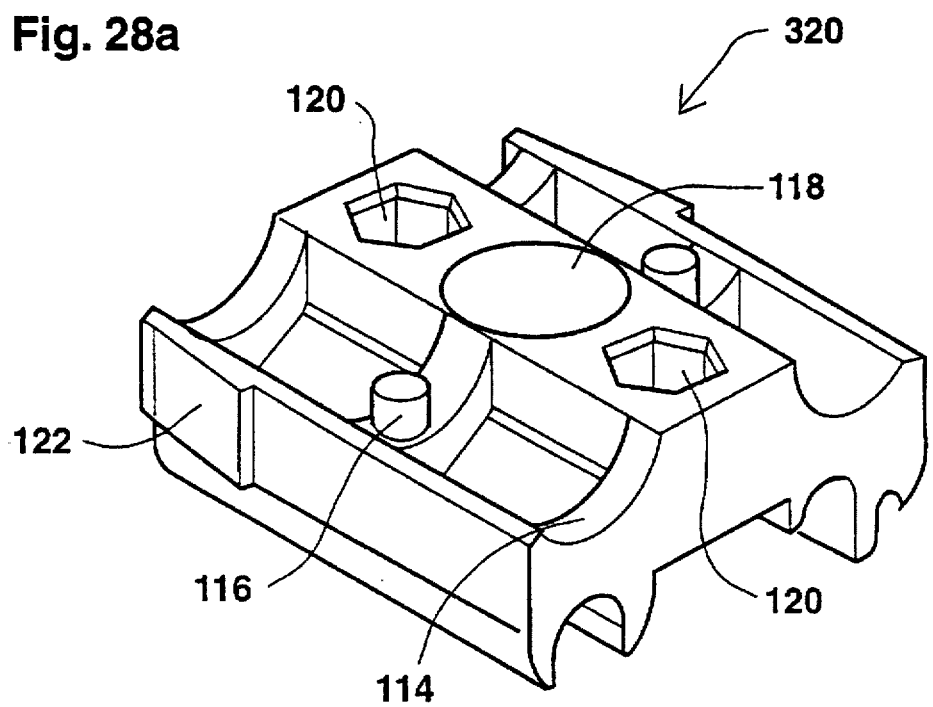
FIG. 28A is a first perspective view of a removable insert, constructed and operative according to the teachings of the present invention, for use in a connector to vary the vertical position of a linking element.
Figure 28B:
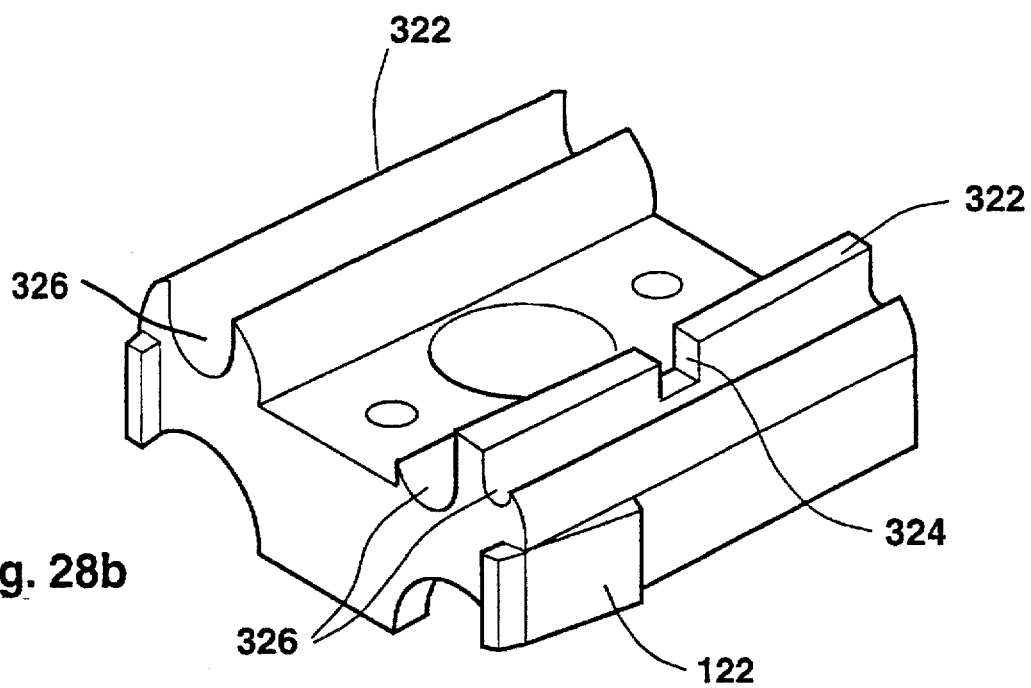
FIG. 28B is a second perspective view of the removable insert of FIG. 28A.

Turning now to the details of removable insert 320, these are shown in FIGS. 28A and 28B. FIG. 28A particularly shows features of removable insert 320 which are similar to those of the inner surface of connector 109, as shown in FIGS. 4 and 5. Equivalent features are labelled similarly. FIG. 28B shows additional features of removable insert 320 which are generally complementary to the features of the inner surface of connector 109. Thus, removable insert 320 has projecting ridges 322 which have a generally cylindrical form matching the shape of contoured guides 114 and having a cavity 324 for receiving protruding members 116. Projecting ridges 322 preferably have a number of channels 326 of different sizes along their length for receiving electrical wires, as will be described below.

Figure 29:
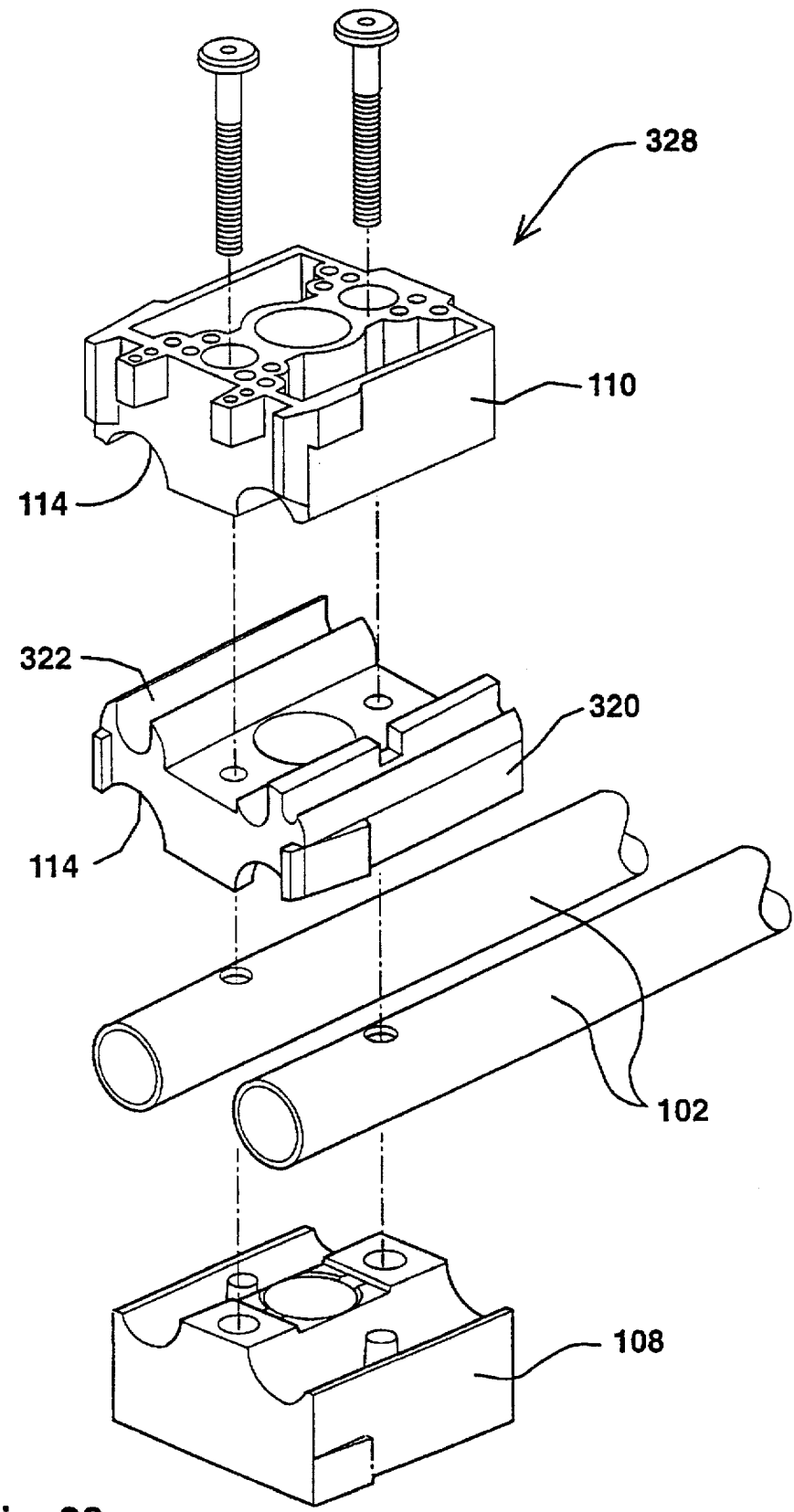
FIG. 29 is a perspective view of the components of a connector including the removable insert of FIG. 28A.

FIG. 29 shows the construction of a connector, generally designated 328, including removable insert 320. Connector 328 is generally similar to connector 104, with removable insert 320 interposed between upper connector 110 and rods 102. Contoured guides 114 of removable insert 320 grip rods 102 in the same manner as upper connector 110 of connector 104, and projecting ridges 322 match similarly to inner surface of upper connector 110.

Figure 30A:
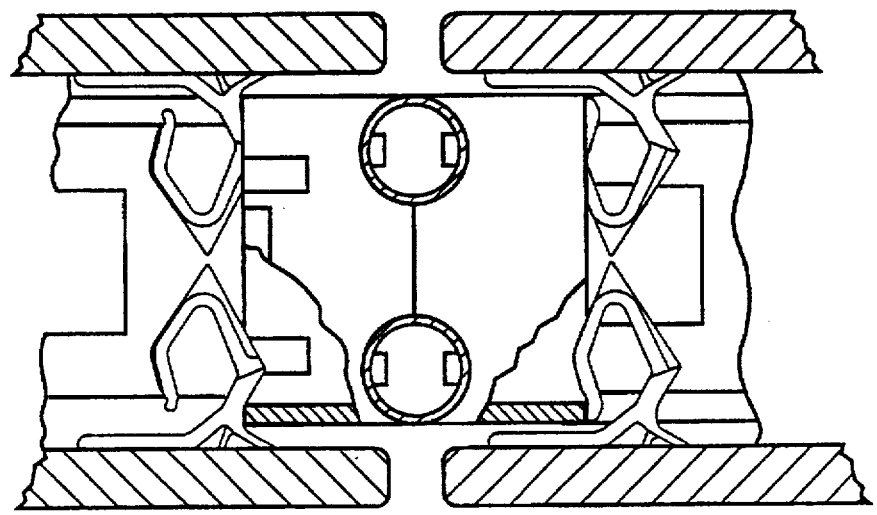
FIG. 30A is a side cross-sectional view through a space partition showing the vertical position of a linking element when the removable insert of FIG. 28A is not used.
Figure 30B:
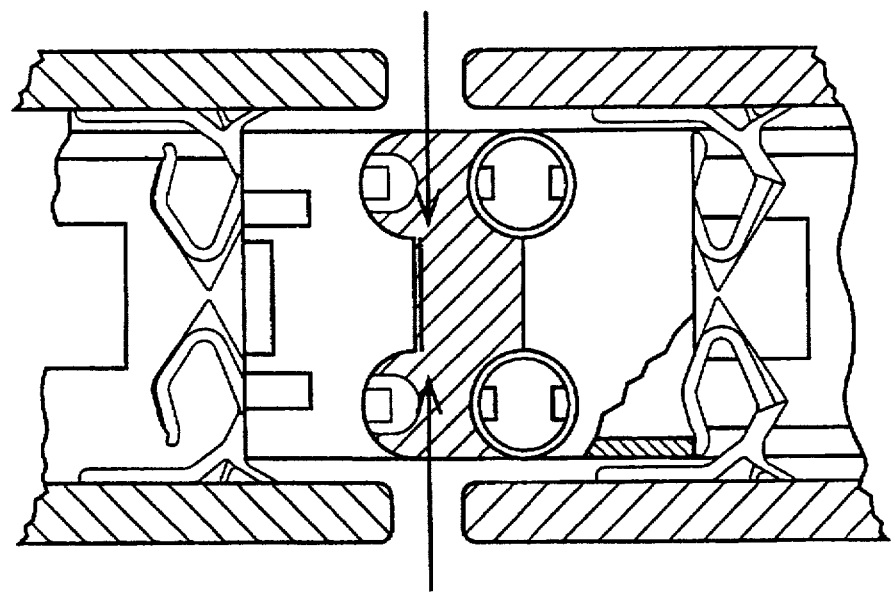
FIG. 30B is a side cross-sectional view through a space partition showing the vertical position of a linking element when the removable insert of FIG. 28A is used.

FIGS. 30A and 30B illustrate the use of removable insert 320. FIG. 30A shows a case in which the position of rods 102 falls out to correspond to the gap 330 between two adjacent panels. This prevents the use of gap 330 for wires or the like entering the space partition. FIG. 30B shows an equivalent structure using connector 328. Here, rods 102 are lowered by the thickness of removable insert 320 to a new position, leaving gap 330 unobstructed for passage of wiring.

Figure 31:
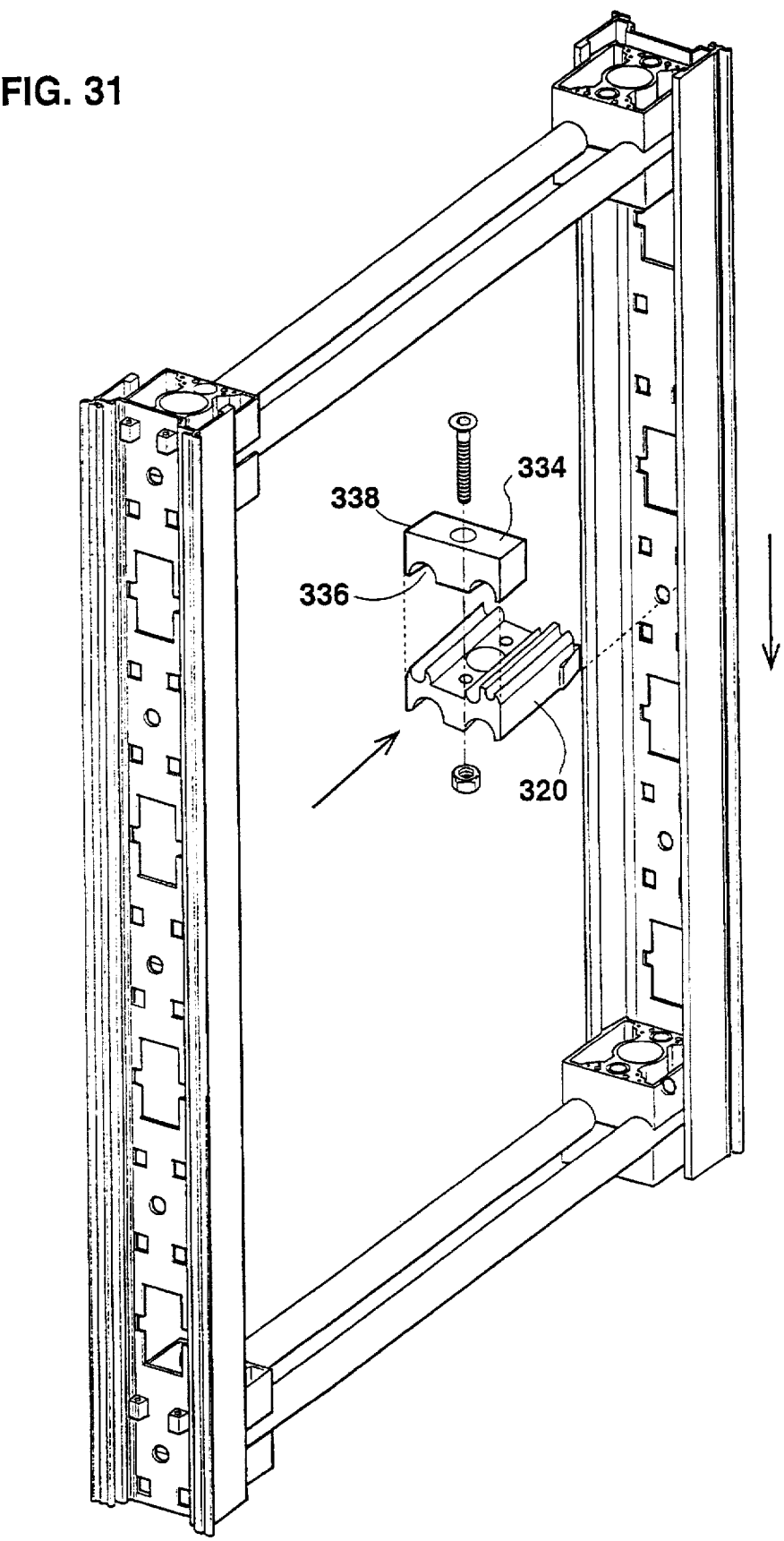
FIG. 31 is a perspective view showing the components of a wire clamp including the removable insert of FIG. 28A.
Figure 32:
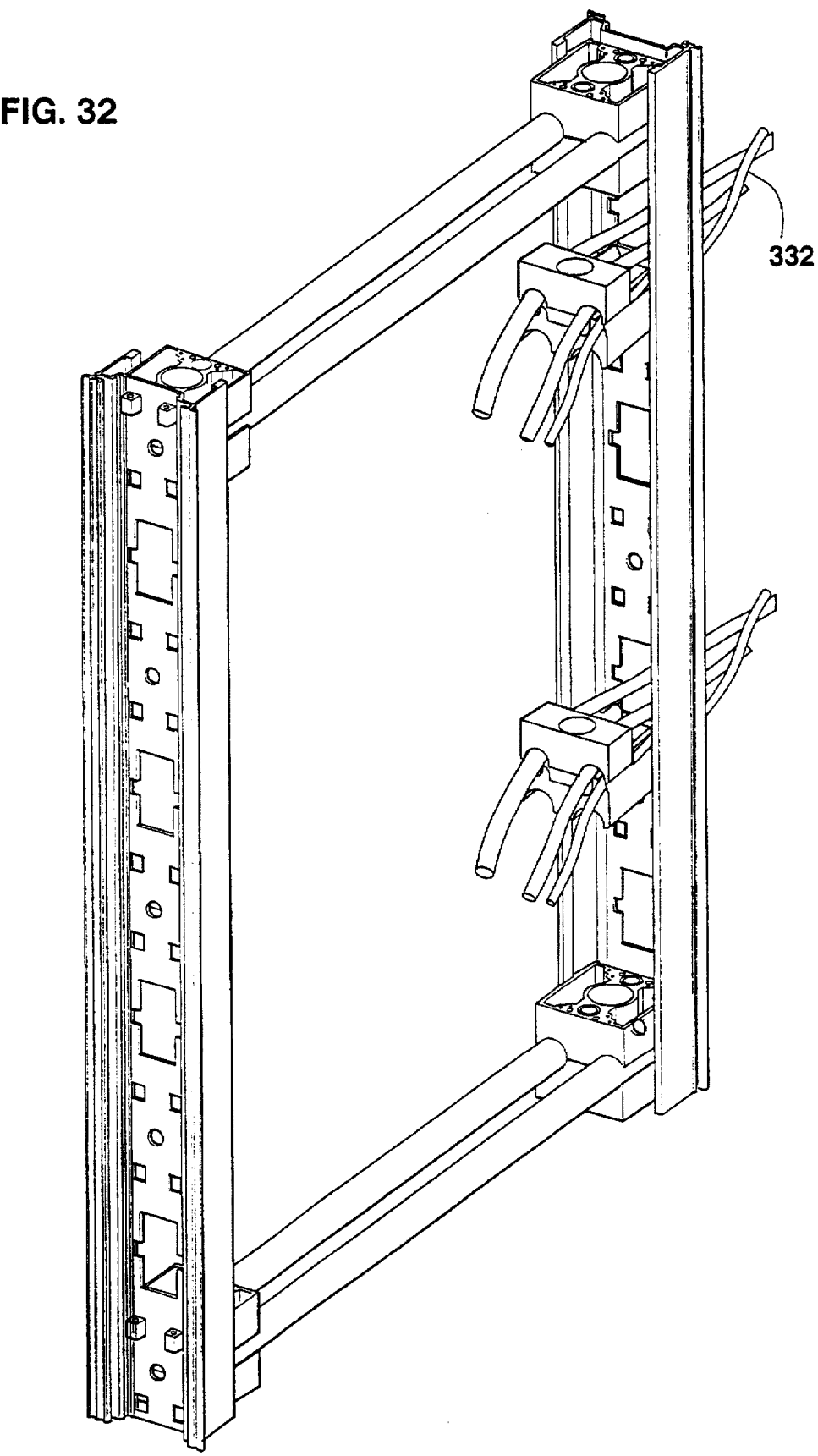
FIG. 32 is a perspective view showing the wire clamp of FIG. 31 in use.

As mentioned above, projecting ridges 322 preferably include a number of channels 326 of different sizes along their length. Channels 326 enable removable insert 320 to function additionally as a clamp for electrical wires and the like passing in through the sides of the space partition. The arrangement of removable insert 320 for use as a clamp is shown in FIGS. 31 and 32. Projections 122 allow convenient attachment of removable insert 320 to vertical member 101 at whatever height is required. A clamping block 334 is provided for clamping wires 332 within channels 326. Clamping block 334 has a clamping surface 336 shaped to complement projecting ridges 322 and a bolt hole 338 for receiving a bolt for tightening clamping block 334 against removable insert 320 to clamp wires 332.

In use, the wires 332 entering the space partition are positioned within the channel 326 of the appropriate size and clamping block 334 is attached to removable insert 320, thereby clamping wires 332 firmly. Typically, wires 332 clamped in this way withstand forces in excess of 10 kg force for short periods.

Figure 33:
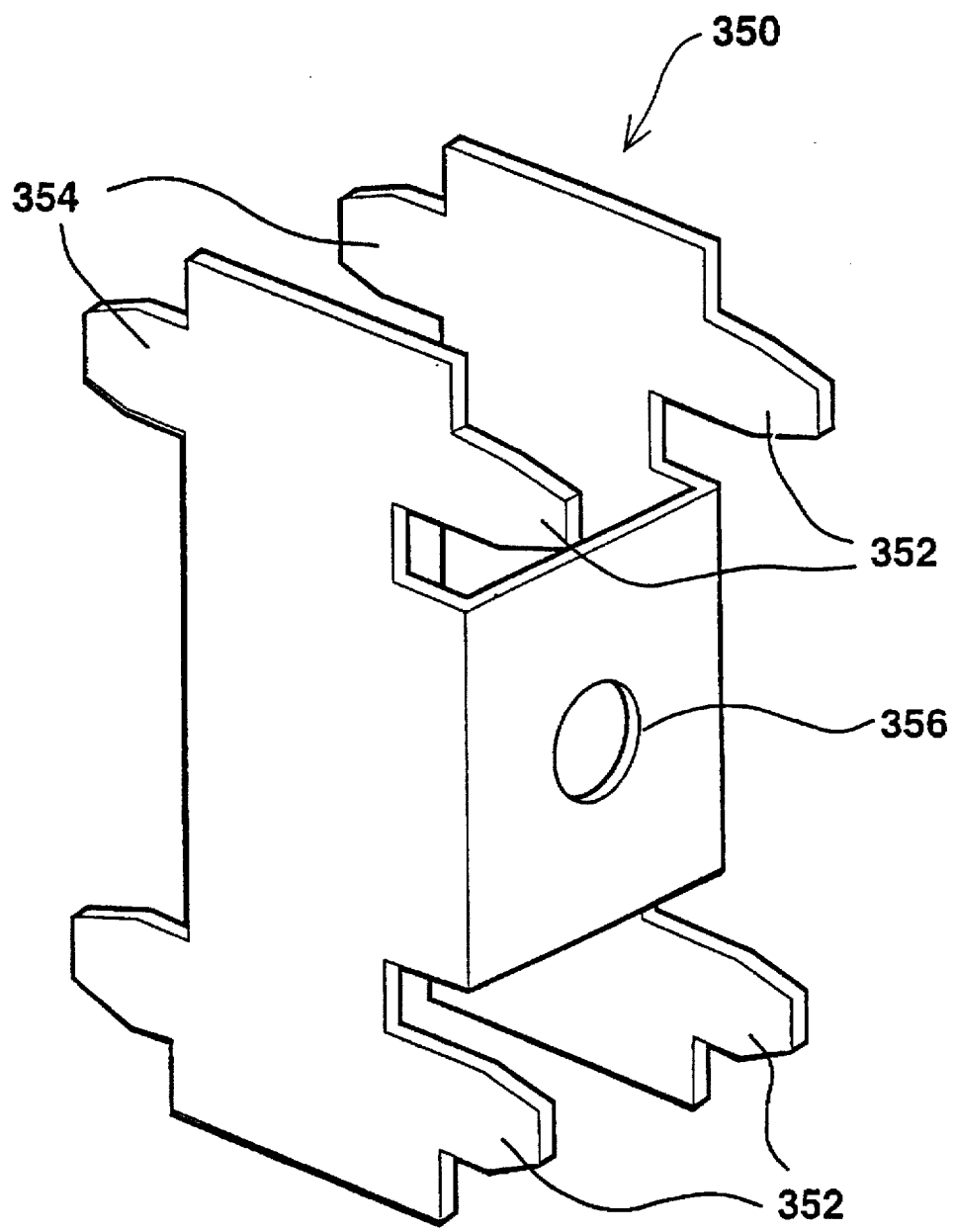
FIG. 33 is a perspective view of an alignment insert, constructed and operative according to the teachings of the present invention, for aligning the vertical members of two adjacent spans.
Figure 34:
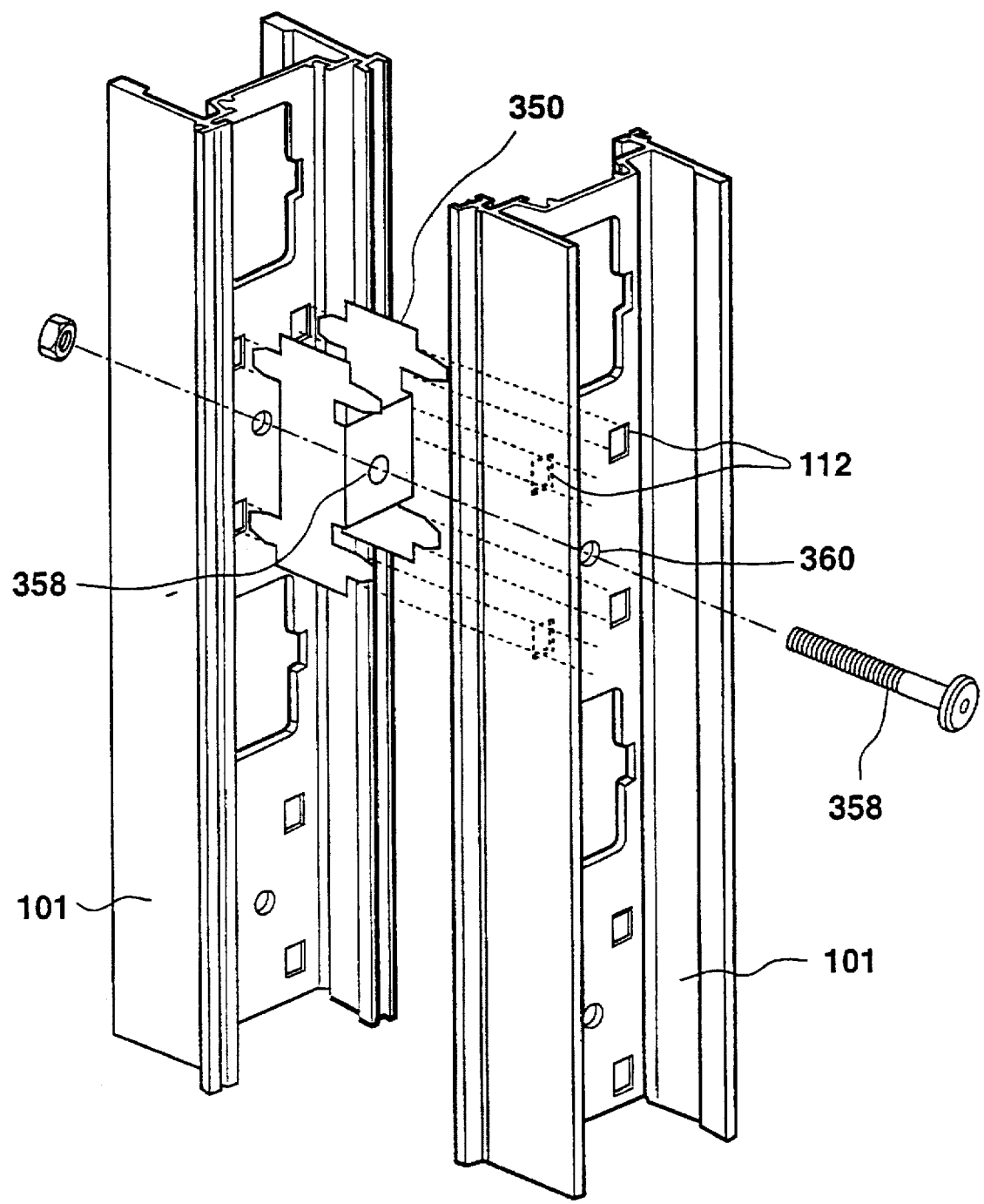
FIG. 34 is an exploded perspective view showing the attachment of the alignment insert of FIG. 33 to two vertical members.
Figure 35:
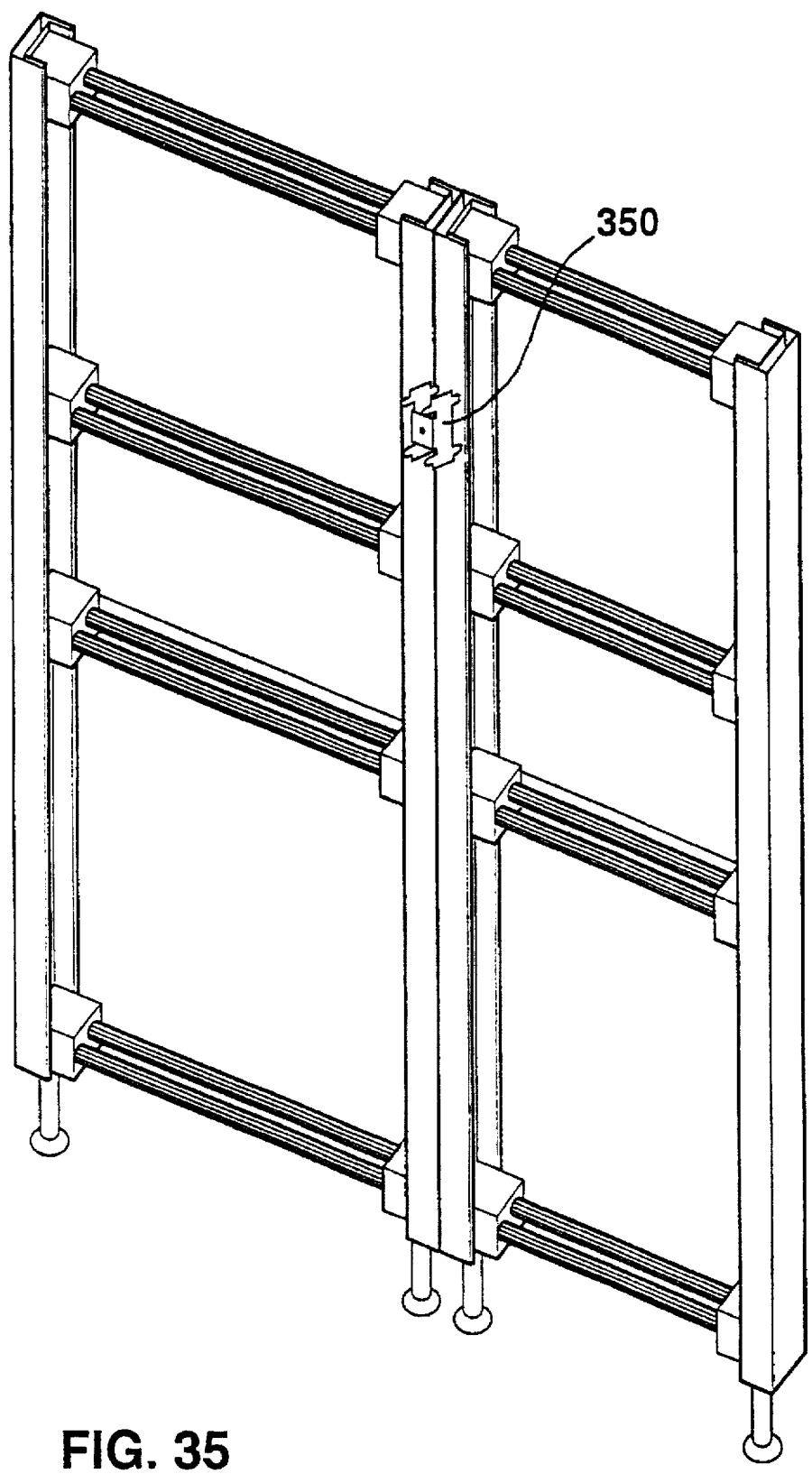
FIG. 35 is a perspective view showing the alignment insert of FIG. 33 in use to align two adjacent spans of a space partition.

Turning now to FIGS. 33–35, an alignment insert, generally designated 350, for vertical alignment of adjacent vertical members 101 will be described. In many cases, items of furniture such as shelves or desks are attached to the space partitions of the present invention over a number of spans. In such a case, it is important that adjacent spans be positioned and maintained in accurate vertical alignment.

The structure of alignment insert 350 is shown in FIG. 33. Alignment insert 350 is typically formed from a unitary sheet of metal, cut and bent into an appropriate form. Alternatively, other materials including, but not limited to, molded plastics may be used. Preferably, alignment insert 350 has four pins 352 extending in a first direction and four corresponding pins 354 aligned with pins 352 and extending in the opposite direction. Pins 352 and 354 are spaced to match the spacing of slits 112 in vertical members 101. Alignment insert 350 preferably also features a bolt hole 356 positioned centrally between pins 352.

FIG. 34 illustrates how alignment insert 350 is attached between two vertical members 101. Pins 352 and 354 engage corresponding slits 112 in each vertical member 101. Optionally, a bolt 358, passing through bolt hole 356 and corresponding bolt holes 360 in vertical members 101, may be used to fasten vertical members 101 together, thereby providing extra rigidity.

FIG. 35 shows the use of alignment insert 350 for maintaining two spans in vertical alignment.

Turning now to FIGS. 36–39, a wire clip, generally designated 370, for clipping wires passing between two rods will be described. In the context of the space partitions of the present invention, wire clip 370 is particularly suited to clipping wires passing vertically between rods 102, for example, from under-floor or overhead sources. However, wire clip 370 may equally be used in any case that wires or the like pass between two rods, cylinders or tubes. The term "rods" is herein used generically to include all such possibilities.

Figure 36:
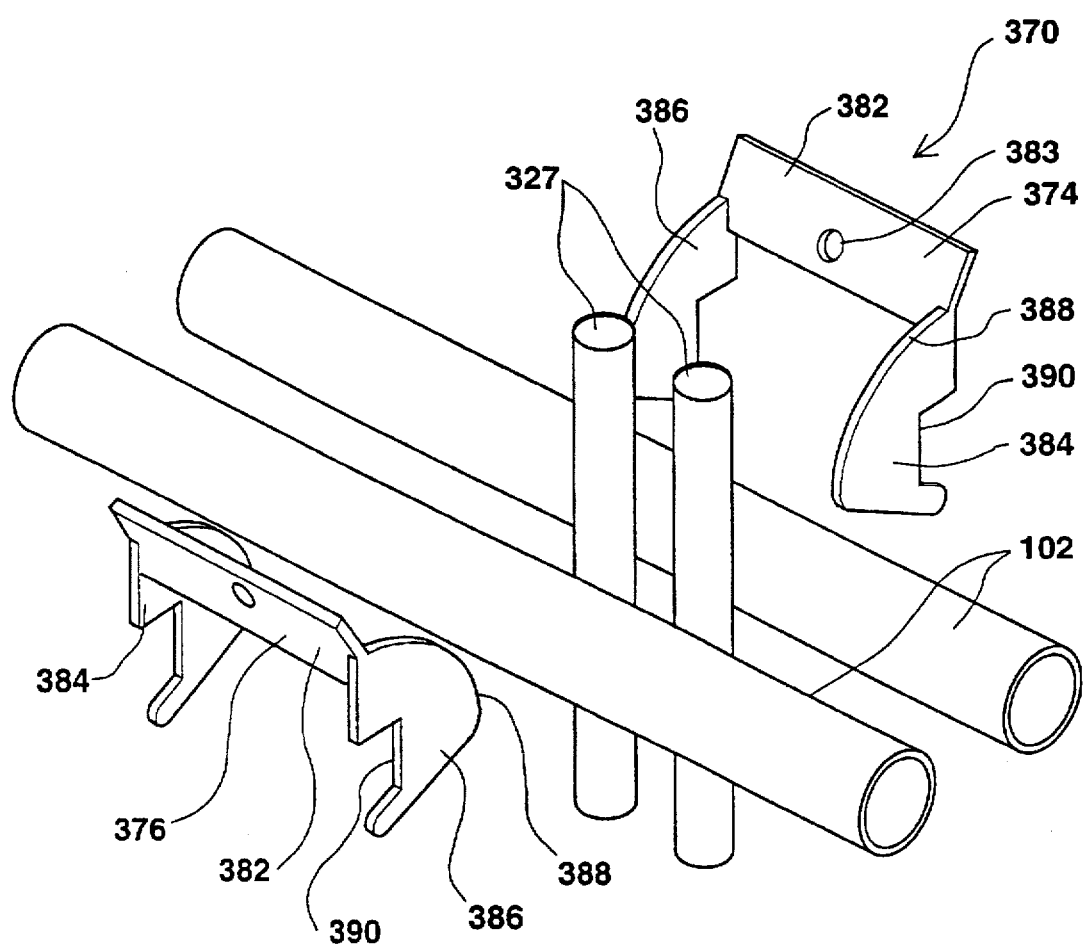
FIG. 36 is a perspective view of the components of a wire clip, constructed and operative according to the teachings of the present invention, which uses two jaws to clip wires passing between two parallel rods.

FIG. 36 shows the components of wire clip 370 for clipping wires 372 which pass between, and approximately perpendicular to, parallel rods 102. Wire clip 370 includes a first jaw 374, a second jaw 376 and a tightening element, typically in the form of a nut 378 and a bolt 380.

First and second jaws 374 and 376, which are typically identical, each include a clamping strip 382 integrally formed with a first side 384 at one end, and a second side 386 at the other end. Clamping strip 382 is generally planar with a bolt hole 383 near its center. Sides 384, 386 are generally planar and perpendicular to clamping strip 382. Each side 384, 386 has a convex curve 388 around its periphery along a major part of one edge and a cut-away socket 390 for receiving one of rods 102 in the opposite edge. Cut-away sockets 390 are so shaped that they can receive rods 102 freely from their open side, thereby defining an insertion direction. Once engaging a rod 102, cut-away sockets 390 allow rotation of jaw 374 or 376 about rod 102, but obstruct movement perpendicular to the insertion direction. Convex curves 388 are shaped so that the width, w, of sides 384, 386 from cut-away sockets 390 to convex curves 388 measured medially, roughly parallel to the insertion direction, is slightly less than the spacing of rods 102, whereas the width, w', measured distally, i.e., perpendicular to the insertion direction is significantly smaller. Overall, sides 384, 386 may be described as being formed as "hooks". The plane of clamping strip 382 is generally perpendicular to the insertion direction.

Figure 37:
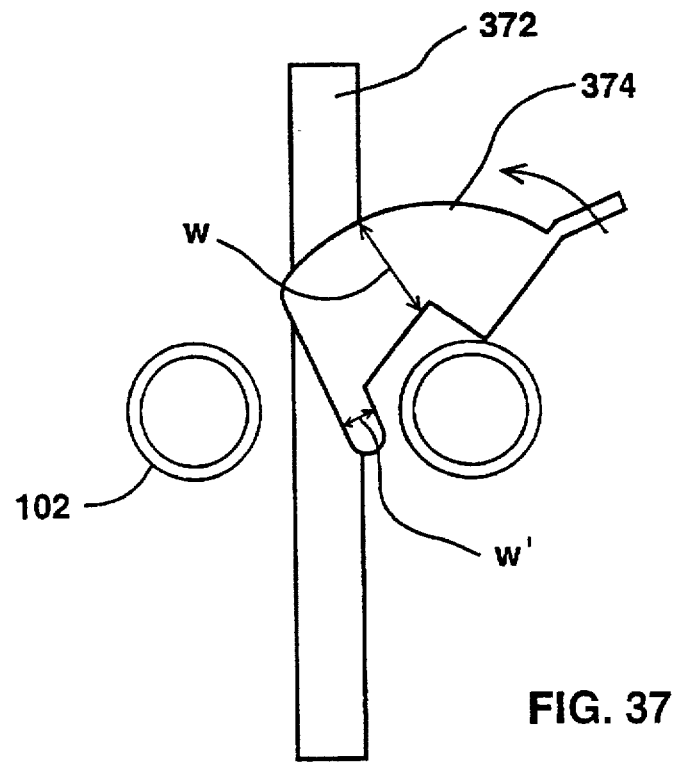
FIG. 37 is a side view of one of the jaws of the clip of FIG. 36 in a first angular position.
Figure 38:
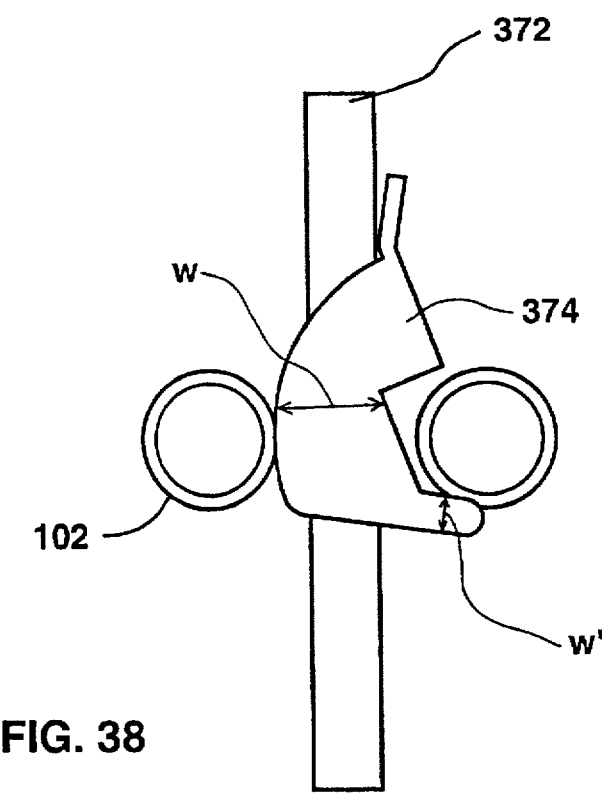
FIG. 38 is a side view of one of the jaws of the clip of FIG. 36 in a second angular position.

In use, first jaw 374 is held in a first angular position with the distal part of sides 384 and 386 between rods 102 and clamping strip 382 lying roughly parallel to the plane of rods 102, as shown in FIG. 37. In this position, first jaw 374 is hooked over a first one of rods 102 with wires 372 enclosed between first and second sides 384 and 386. First jaw 374 is then rotated to a second angular position in which clamping strip 382 is adjacent to wires 372, as shown in FIG. 38. In this position, first and second sides 384 and 386 become trapped between the parallel rods such that first jaw 374 is retained therebetween.

Figure 39:
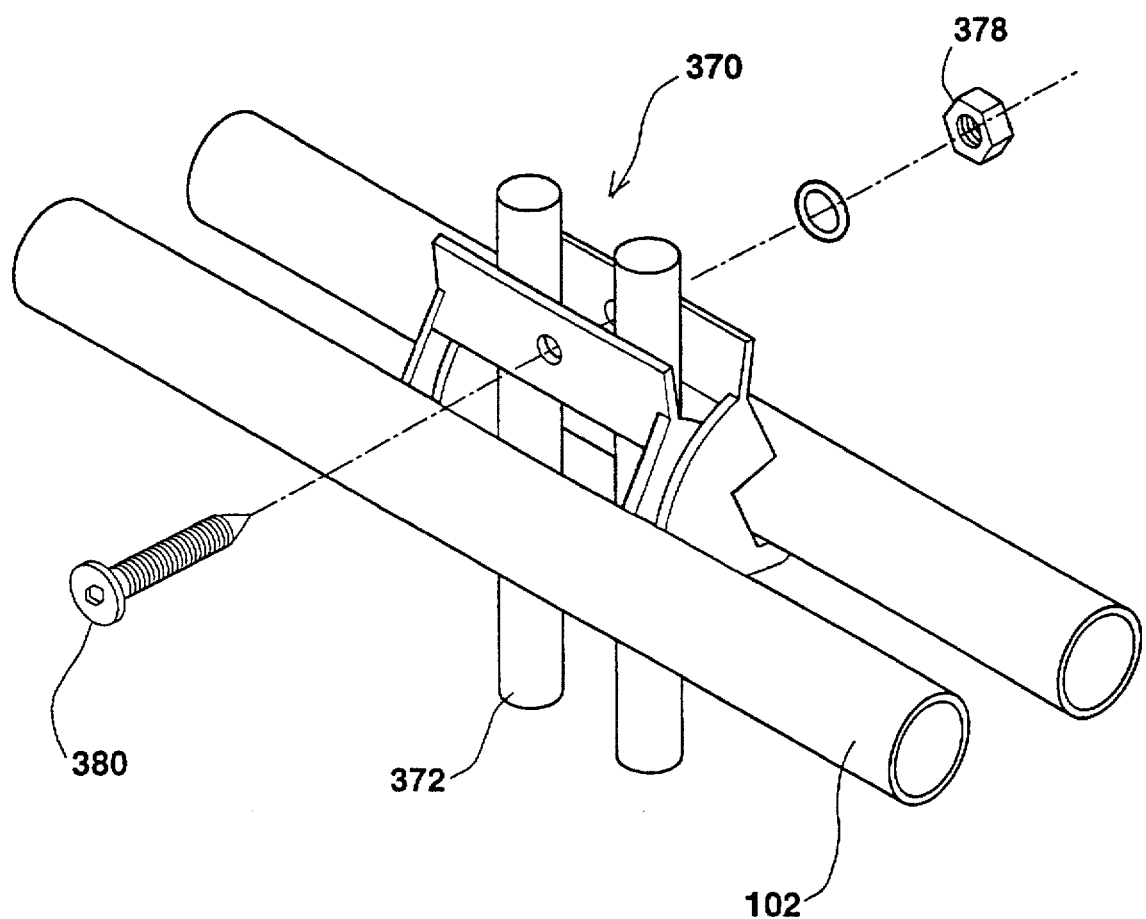
FIG. 39 is a perspective view of the wire clip of FIG. 36 in use.

Second jaw 376 is then attached similarly to the second of rods 102 on the opposite side of wires 372 with its sides 384 and 386 immediately adjacent to those of first jaw 374. Wires 372 are thus enclosed in a generally rectangular enclosure formed by clamping strips 382 and abutting sides 384 and 386 of both jaws 374 and 376. Clamping strips 382 are then fixed together and tightened by use of bolt 380 and nut 378 engaged in bolt holes 383. In this manner, wires 372 are clamped firmly between clamping strips 382 of first and second jaws 374 and 376. This configuration is illustrated in FIG. 39.

Figure 40:
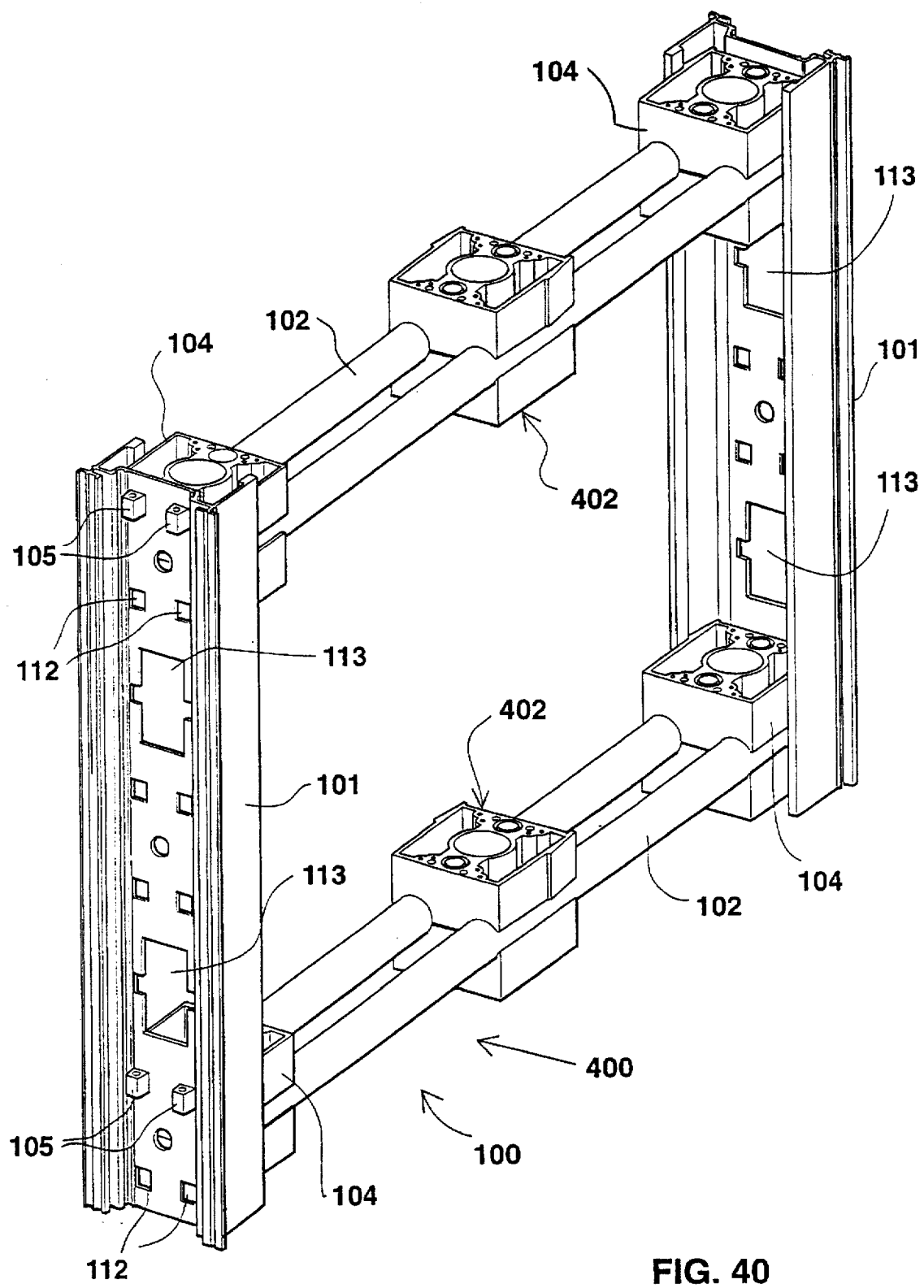
FIG. 40 is a schematic perspective view of an additional configuration of a space partition framework, constructed and operative according to the teachings of the present invention.

Finally, with reference to FIG. 40, an important additional configuration of a space partition framework, generally designated 400, constructed and operative according to the teachings of the present invention, will now be described. framework 400 is similar to the space partition framework of FIG. 2, with the addition of one or more connectors 402 fixed at an intermediate position along cross members 102. Connectors 402 are similar to connectors 104, and are prevented from sliding along rods 102 by protruding members 116 engaged in holes in rods 102 as explained above with reference to FIGS. 4 and 5.

Connectors 402 are valuable in a wide range of circumstances. For example, in a wide span, a vertical rod may be secured within opening 118 of one or more connectors 402 for providing extra support to the floor and/or ceiling. Connectors 402 may also provide an intermediate support for a modular plinth assembly of the type described above with reference to FIGS. 18–24. Connectors 402 may also provide points of connection for other purposes, such as for attachment of a vertical member to the face of space partition framework 400 so as to form a mid-span junction with a second space partition framework perpendicular to framework 400.

It will be readily appreciated that the features of the various embodiments described above are in no way exclusive to those embodiments. In fact, it will generally be advantageous to combine several, or all, of the above embodiments in a given space partition arrangement. For example, swing-out panel assemblies 150 may be installed in numerous positions wherever frequently used electrical sockets or the like are placed. Clip-out panel assemblies 228 and modular trim assemblies 274 may then be used for panelling, tops and plinths for the remainder of the space partition arrangement. This allows convenient access to the inner volume of the space partition wherever and whenever required, such as for rewiring or checking for loose connections. Finally, one or more pop-up cover assembly 292 may be included to provide desk-top level electrical and communications connections, or as a concealed drinks bar.

While the invention has been described with respect to several embodiments, it will be appreciated that many variations, modifications and other applications of the invention may be made.

What is claimed is:

1. A space partition having an inner volume for accommodating electrical wires and the like, and providing convenient access thereto, the space partition comprising:

(a) a pair of vertical members;
   (b) a cross member connecting said vertical members, said cross member including:
      (i) a pair of connectors, each of said connectors capable of engaging one of said vertical members, and
      (ii) a linking element connecting said connectors to each other, said linking element including a pair of parallel rods; and
   (c) a swing-out panel assembly including:
      (i) a bracket attached to said cross member,
      (ii) an upper lever having a first end and a second end, said first end being pivotally attached to said bracket,
      (iii) a lower lever having a first end and a second end, said first end being pivotally attached to said bracket, and
      (iv) a panel pivotally attached to said second ends of said upper lever and said lower lever such that said panel is displaceable between a closed position in which said panel conceals the inner volume and an open position in which said panel allows convenient access to the inner volume.

2. The space partition of claim 1, wherein the space partition has a first face and a second face, said panel forming a part of said first face when in said closed position, the space partition further comprising:

(a) an additional upper lever having a first end and a second end, said first end being pivotally attached to said bracket;
   (b) an additional lower lever having a first end and a second end, said first end being pivotally attached to said bracket; and
   (c) an additional panel pivotally attached to said second ends of said additional upper lever and said additional lower lever such that said additional panel is displaceable between a closed position in which said additional panel conceals the inner volume, forming part of said second face, and an open position in which said additional panel allows convenient access to the inner volume.

3. The space partition of claim 1, further comprising a clip-out panel assembly which includes:

(a) a panel; and
   (b) a plurality of clips attached to said panel, each of said clips having a substantially rigid downward facing hook and an upwardly bearing resilient catch.

4. The space partition of claim 1, wherein said cross member provides at least one vertical bore, the space partition further comprising:

(a) a vertical pole mountable in said at least one vertical bore; and
   (b) a modular trim assembly attachable to said vertical pole to form a plinth along the space partition, said modular trim assembly including:
      (i) a trim support having a substantially concave surface of substantially cylindrical form for abutting said vertical pole and a snap-on/snap-off mounting for receiving a piece of trim,
      (ii) at least one clip for securing said trim support to said vertical pole, and
      (iii) a piece of trim attachable to said trim support.

5. The space partition of claim 1, further comprising an electrical socket assembly including:

(a) an electrical socket for supplying electrical power; and
   (b) a bracket attached to said socket, said bracket being shaped such that, when in a first orientation, said bracket is insertable between said pair of parallel rods and, when rotated to a second orientation, said bracket engages said pair of parallel rods so as to maintain said socket in a fixed position.

6. The space partition of claim 1, further comprising:

(a) a secondary framework mounted within, and vertically displaceable relative to, said vertical members; and
   (b) a cover attached to said secondary framework, wherein said secondary framework assumes a first position in which said cover conceals the inner volume, and a second position in which said cover is raised so as to allow access to the inner volume.

7. A space partition having an inner volume for accommodating electrical wires and the like, and providing convenient access thereto, the space partition comprising:

(a) a pair of vertical members;
   (b) an upper cross member connecting said vertical members and a lower cross member connecting said vertical members, each of said upper and lower cross members including:
      (i) a pair of connectors, each of said connectors capable of engaging one of said vertical members, and
      (ii) a linking element connecting said connectors to each other, said linking element including a pair of parallel rods; and
   (c) a clip-out panel assembly including:
      (i) a panel; and
      (ii) a plurality of clips attached to said panel, each of said clips having a substantially rigid downward facing hook and an upwardly bearing resilient catch such that at least one of said clips provides a substantially rigid downward facing hook for engaging said lower cross member to support said panel and such that at least one of said clips provides a resilient catch for retaining said panel against said upper cross member.

8. The space partition of claim 7, wherein said hook has a depth and said resilient catch has a range of flexibility, said range of flexibility being at least as large as said depth.

9. The space partition of claim 7, wherein said panel has a rear surface, said rear surface being provided with a plurality of slots for attachment of said clips, said slots being positioned such that said clips may be attached to said panel at any of at least three vertical positions.

10. The space partition of claim 7, further comprising a swing-out panel assembly including:

(a) a bracket attached to one of said upper and lower cross members;
    (b) an upper lever having a first end and a second end, said first end being pivotally attached to said bracket;
    (c) a lower lever having a first end and a second end, said first end being pivotally attached to said bracket; and
    (d) a panel pivotally attached to said second ends of said upper lever and said lower lever such that said panel is displaceable between a closed position in which said panel conceals the inner volume and an open position in which said panel allows convenient access to the inner volume.

11. A space partition having an inner volume for accommodating electrical wires and the like, and providing convenient access thereto, the space partition comprising:

(a) a pair of vertical members;

(b) an upper cross member connecting said vertical members and a lower cross member connecting said vertical members, each of said upper and lower cross members including:
  (i) a pair of connectors, each of said connectors capable of engaging one of said vertical members, and
  (ii) a linking element connecting said connectors to each other, each of said upper and lower cross members providing at least one vertical bore;

(c) a vertical pole mounted in said vertical bore of said lower cross member; and (d) a modular trim assembly attachable alternately to said vertical pole to form a plinth of the space partition, and to said vertical bore of said upper cross member to form a top to the space partition, said modular trim assembly including:
  (i) a trim support having a substantially concave surface of substantially cylindrical form for abutting said vertical pole, a substantially cylindrical projection for engaging said vertical bore of said upper cross member, and a snap-on/snap-off mounting for receiving a piece of trim,
  (ii) at least one clip for securing said trim support alternately to said vertical pole and to said vertical bore of said upper cross member, and
  (iii) a piece of trim attachable to said trim support.

12. The space partition of claim 11, wherein said trim support provides two substantially concave surfaces of substantially cylindrical form for abutting two vertical poles, and two substantially cylindrical projections for engaging two vertical bores.

13. The space partition of claim 11, further comprising a swing-out panel assembly including:
  (a) a bracket attached to one of said upper and lower cross members;
  (b) an upper lever having a first end and a second end, said first end being pivotally attached to said bracket;
  (c) a lower lever having a first end and a second end, said first end being pivotally attached to said bracket; and
  (d) a panel pivotally attached to said second ends of said upper lever and said lower lever such that said panel is displaceable between a closed position in which said panel conceals the inner volume and an open position in which said panel allows convenient access to the inner volume.

14. A space partition providing a hidden electrical power supply, the space partition comprising:
  (a) a pair of vertical members;
  (b) a cross member connecting said vertical members, said cross member including:
    (i) a pair of connectors, each of said connectors capable of engaging one of said vertical members, and
    (ii) a linking element connecting said connectors to each other, said linking element including a pair of parallel rods sufficiently separated so as to accommodate the presence of electrical wires; and
  (c) an electrical socket assembly including:
    (i) an electrical socket for supplying electrical power, and
    (ii) a bracket attached to said socket, said bracket being shaped such that, when in a first orientation, said bracket is insertable between said pair of parallel rods and, when rotated to a second orientation, said bracket engages said pair of parallel rods so as to maintain said socket in a fixed position.

15. The space partition of claim 14, further comprising a swing-out panel assembly including:
  (a) a bracket attached to said cross member;
  (b) an upper lever having a first end and a second end, said first end being pivotally attached to said bracket;
  (c) a lower lever having a first end and a second end, said first end being pivotally attached to said bracket; and
  (d) a panel pivotally attached to said second ends of said upper lever and said lower lever such that said panel is displaceable between a closed position in which said panel conceals the inner volume and an open position in which said panel allows convenient access to the inner volume.

16. The space partition of claim 14, further comprising a clip-out panel assembly which includes:
  (a) a panel; and
  (b) a plurality of clips attached to said panel, each of said clips having a substantially rigid downward facing hook and an upwardly bearing resilient catch.

17. The space partition of claim 14, further comprising:
  (a) a secondary framework mounted within, and vertically displaceable relative to, said vertical members; and
  (b) a cover attached to said secondary framework, wherein said secondary framework assumes a first position in which said cover conceals the inner volume, and a second position in which said cover is raised so as to allow access to the inner volume.

18. A space partition having an inner volume with concealed access thereto, the space partition comprising:
  (a) a primary framework;
  (b) a secondary framework mounted within, and vertically displaceable relative to, said primary framework; and
  (c) a cover attached to said secondary framework, wherein said secondary framework assumes a first position in which said cover abuts said primary framework so as to conceal the inner volume, and a second position in which said cover is lifted away from said primary framework thereby allowing access to the inner volume.

19. The space partition of claim 18, further comprising a substantially horizontal work-top associated with said primary framework such that, when said secondary framework assumes said first position, said cover forms a substantially continuous surface with said work-top.

20. The space partition of claim 18, further comprising a latch mechanism for temporarily retaining said secondary framework in said second position.

21. The space partition of claim 18, wherein said secondary framework additionally supports at least one electrical connector.

22. The space partition of claim 18, wherein said secondary framework additionally supports a shelf for hidden storage.

23. The space partition of claim 18, wherein said primary framework includes:
  (a) a pair of vertical members;
  (b) a cross member connecting said vertical members, said cross member including:
    (i) a pair of connectors, each of said connectors capable of engaging one of said vertical members, and
    (ii) a linking element connecting said connectors to each other, said linking element including a pair of parallel rods sufficiently separated so as to accommodate the presence of electrical wires.

24. A space partition, the space partition comprising:
  (a) two spans, each span including:

(i) a pair of vertical members, each vertical member having a plurality of slits, (ii) a cross member connecting said vertical members, said cross member including:

(A) a pair of connectors, each of said connectors capable of engaging one of said vertical members, and (B) a linking element connecting said connectors to each other, said linking element including a pair of parallel rods; and (b) an alignment insert for engaging said plurality of slits in one of said vertical members of each of said two spans, thereby maintaining said two spans in vertical alignment.

25. A space partition comprising:

(a) a pair of vertical members;

(b) a cross member connecting said vertical members, said cross member including:

(i) a pair of connectors, each of said connectors capable of engaging one of said vertical members, and (ii) a linking element connecting said connectors to each other, said linking element including a pair of parallel rods, wherein each of said connectors includes a locating element for engaging one of said vertical members and for being able to receive said linking element at a first vertical position, and a removable insert for inserting between said locating element and said linking element such that said linking element assumes a second vertical position.

26. The space partition of claim 25, wherein said removable insert includes at least one channel for receiving at least one electrical wire, further comprising a clamping block attachable to said removable insert so as to clamp said at least one electrical wire within said at least one channel.

27. A space partition framework comprising:

(a) a pair of vertical members;

(b) a cross member connecting said vertical members, said cross member including:

(i) a pair of connectors, each of said connectors capable of engaging one of said vertical members, and (ii) a linking element connecting said connectors to each other, said linking element including a pair of parallel rods; and (c) at least one additional connector attached at an intermediate position along said linking element, said additional connector providing a substantially cylindrical vertical opening.

* * * * *